United States Patent
Yamashita

(10) Patent No.: US 12,492,736 B2
(45) Date of Patent: Dec. 9, 2025

(54) SHOCK ABSORBER

(71) Applicant: Hitachi Astemo, Ltd., Ibaraki (JP)

(72) Inventor: Mikio Yamashita, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 390 days.

(21) Appl. No.: 18/023,823

(22) PCT Filed: Sep. 21, 2021

(86) PCT No.: PCT/JP2021/034562
§ 371 (c)(1),
(2) Date: Feb. 28, 2023

(87) PCT Pub. No.: WO2022/075056
PCT Pub. Date: Apr. 14, 2022

(65) Prior Publication Data
US 2023/0220902 A1 Jul. 13, 2023

(30) Foreign Application Priority Data
Oct. 9, 2020 (JP) .................... 2020-171044

(51) Int. Cl.
*F16F 9/48* (2006.01)
*B60G 13/08* (2006.01)
(Continued)

(52) U.S. Cl.
CPC ........... *F16F 9/512* (2013.01); *B60G 13/08* (2013.01); *B60G 17/08* (2013.01); *F16F 9/348* (2013.01);
(Continued)

(58) Field of Classification Search
CPC .... F16F 9/486; F16F 9/48; F16F 9/504; F16F 9/5123; B60G 13/08; B60G 17/08; B60G 2202/24; B60G 2206/41
See application file for complete search history.

(56) References Cited

U.S. PATENT DOCUMENTS

| | | | | |
|---|---|---|---|---|
| 5,096,168 A | * | 3/1992 | Takehara | F16F 9/185 267/152 |
| 2015/0247547 A1 | * | 9/2015 | Yamashita | F16F 9/585 188/313 |

(Continued)

FOREIGN PATENT DOCUMENTS

| | | |
|---|---|---|
| JP | 2015-68439 A | 4/2015 |
| WO | 2017/047661 A1 | 3/2017 |

OTHER PUBLICATIONS

International Search Report received in corresponding International Application No. PCT/JP2021/034562 dated Nov. 9, 2021.
(Continued)

*Primary Examiner* — Bradley T King
(74) *Attorney, Agent, or Firm* — MATTINGLY & MALUR, PC

(57) ABSTRACT

This shock absorber has a first damping force characteristic that is exhibited when a piston speed is from a low-speed region to a high-speed region while a relative position of a piston with respect to a cylinder is in a first range during a low frequency, a second damping force characteristic greater than the first damping force characteristic is exhibited when the piston speed is from the low-speed region to the high-speed region while the relative position is in a second range different from the first range during a low frequency, and a difference in damping force characteristic between during the first range and during the second range is smaller than a difference between the first damping force characteristic and the second damping force characteristic during a high fre- (Continued)

quency. A second passage is provided with a variable orifice mechanism with a changeable orifice area based on relative position.

8 Claims, 5 Drawing Sheets

(51) Int. Cl.
    *B60G 17/08*     (2006.01)
    *F16F 9/348*     (2006.01)
    *F16F 9/512*     (2006.01)

(52) U.S. Cl.
    CPC ............ *F16F 9/48* (2013.01); *B60G 2202/24* (2013.01); *B60G 2206/41* (2013.01)

(56) References Cited

U.S. PATENT DOCUMENTS

| | | | |
|---|---|---|---|
| 2016/0031284 A1* | 2/2016 | Yamashita | F16F 9/465 188/266 |
| 2016/0040742 A1* | 2/2016 | Yamashita | F16F 9/486 188/284 |
| 2018/0216690 A1 | 8/2018 | Yamashita | |
| 2021/0180662 A1* | 6/2021 | Lizarraga Senar | F16F 9/19 |
| 2024/0376954 A1* | 11/2024 | Kotani | F16F 9/512 |

OTHER PUBLICATIONS

Written Opinion received in corresponding International Application No. PCT/JP2021/034562 dated Nov. 9, 2021.

* cited by examiner

SHOCK ABSORBER

TECHNICAL FIELD

The present invention relates to a shock absorber. Priority is claimed on Japanese Patent Application No. 2020-171044, filed Oct. 9, 2020, the content of which is incorporated herein by reference.

BACKGROUND ART

Regarding a shock absorber, there is a position sensitive damping force variable shock absorber in which a damping force is changed depending on a stroke position (for example, refer to Patent Document 1). In addition, regarding a shock absorber, there is a shock absorber in which a damping force is variable in accordance with a vibration state (for example, refer to Patent Document 2).

CITATION LIST

Patent Document

[Patent Document 1]
Japanese Unexamined Patent Application, First Publication No. 2015-68439
[Patent Document 2]
PCT International Publication No. WO2017/047661

SUMMARY OF INVENTION

Technical Problem

In a position sensitive damping force variable shock absorber, it is desired to favorably control a damping force in accordance with a frequency.

Regarding a position sensitive damping force variable shock absorber, the present invention provides a shock absorber capable of favorably controlling a damping force in accordance with a frequency.

Solution to Problem

According to a first aspect of the present invention, a shock absorber includes a cylinder in which an operation fluid is sealed, a piston which is provided in a manner of being able to slide inside the cylinder and divides an inside of the cylinder into a rod-side chamber and a bottom-side chamber, a piston rod in which one end side is coupled to the piston and the other end side extends to an outside of the cylinder, a first passage through which an operation fluid flows out from one chamber inside the cylinder in response to movement of the piston, a second passage which is provided in parallel to the first passage, and a damping force generation mechanism which is provided in the first passage and generates a damping force. The second passage is provided with a variable orifice mechanism in which an orifice area is able to change depending on a relative position of the piston with respect to the cylinder, and a frequency sensitive mechanism in which a damping force during a low frequency is greater than a damping force during a high frequency regardless of a piston speed. The shock absorber is constituted such that a first damping force characteristic is exhibited when the piston speed is from a low-speed region to a high-speed region while the relative position of the piston with respect to the cylinder is in a first range during a low frequency, a second damping force characteristic greater than the first damping force characteristic is exhibited when the piston speed is from the low-speed region to the high-speed region while the relative position of the piston with respect to the cylinder is in a second range different from the first range during a low frequency, and a difference in damping force characteristic between during the first range and during the second range is smaller than a difference between the first damping force characteristic and the second damping force characteristic during a high frequency.

According to another aspect of the present invention, a shock absorber includes a cylinder in which an operation fluid is sealed; a piston which is provided in a manner of being able to slide inside the cylinder and divides an inside of the cylinder into a rod-side chamber and a bottom-side chamber; a piston rod in which one end side is coupled to the piston and the other end side extends to an outside of the cylinder; a first passage through which an operation fluid flows out from one chamber inside the cylinder in response to movement of the piston and which is formed in the piston; a second passage which is provided in parallel to the first passage; a damping force generation mechanism which has a first valve provided in the first passage and generating a damping force, and a back pressure chamber applying a back pressure to the first valve; a tightening member in which at least a part of the second passage is formed; a flexible member which is disposed inside a case member and is able to flex inside the case member; a chamber inside the case member which is defined and provided by the flexible member; a hole which is formed on an inner circumferential side of the piston rod; a pin member which is inserted into the hole and varies a gap with respect to the hole depending on a position in an axial direction; and a hollow chamber which is formed by the hole and the pin member. The hollow chamber communicates with a third passage through which an operation fluid in the rod-side chamber is supplied in a state not changing depending on a relative position between the cylinder and the piston, a fourth passage through which an operation fluid is supplied to the back pressure chamber, and a fifth passage through which an operation fluid is supplied to the case member, and a sixth passage through which an operation fluid is supplied to the bottom-side chamber via the tightening member.

Advantageous Effects of Invention

According to the foregoing shock absorber, in a position sensitive damping force variable shock absorber, it is possible to favorably control a damping force in accordance with a frequency.

DESCRIPTION OF EMBODIMENT

An embodiment according to the present invention will be described on the basis of the drawings. Hereinafter, for the sake of convenience of description, the upper side in FIGS. 1 to 4 will be described as "upper", and the lower side in FIGS. 1 to 4 will be described as "lower".

Figure 1:
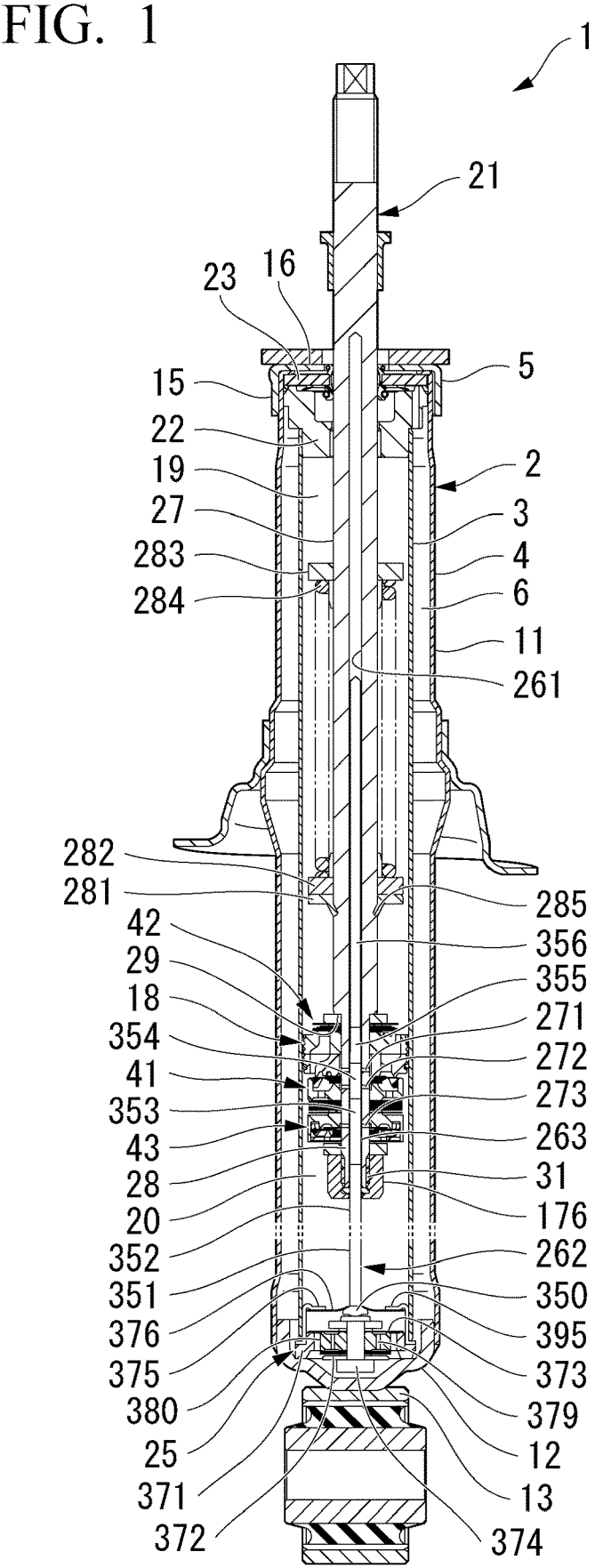
FIG. 1 is a cross-sectional view illustrating a shock absorber of an embodiment according to the present invention.

As illustrated in FIG. 1, a shock absorber 1 of the present embodiment is a double cylinder-type hydraulic shock absorber and has a cylinder 2 in which an operation fluid is sealed. The cylinder 2 has an inner cylinder 3 having a cylindrical shape, an outer cylinder 4 having a larger diameter than this inner cylinder 3 and having substantially a bottomed cylindrical shape concentrically provided such that the inner cylinder 3 is covered, and a cover 5 covering an upper opening side of the outer cylinder 4. In the cylinder 2, a space between the inner cylinder 3 and the outer cylinder 4 serves as a reservoir chamber 6.

The outer cylinder 4 is constituted of a barrel member 11 having substantially a cylindrical shape, and a bottom member 12 fitted and fixed to a lower portion side of the barrel member 11 and blocking the lower portion of the barrel member 11. An attachment eye 13 is fixed to the bottom member 12 on an outward side opposite to the barrel member 11 in an axial direction.

The cover 5 has a cylindrical portion 15 and an inner flange portion 16 extending inward in a radial direction from an upper end side of the cylindrical portion 15. The cover 5 is put over the barrel member 11 such that an upper end opening portion of the barrel member 11 is covered by the inner flange portion 16 and an outer circumferential surface of the barrel member 11 is covered by the cylindrical portion 15. In this state, a part of the cylindrical portion 15 is swaged inward in the radial direction and is fixed to the barrel member 11.

A piston 18 is slidably fitted into the inner cylinder 3 of the cylinder 2. The piston 18 provided inside the inner cylinder 3 divides the inside of the inner cylinder 3 into two chambers, such as an upper chamber 19 (rod-side chamber) and a lower chamber 20 (bottom-side chamber). Inside the cylinder 2, oil serving as an operation fluid is sealed inside the upper chamber 19 and the lower chamber 20 inside the inner cylinder 3, and oil and gas serving as operation fluids are sealed inside the reservoir chamber 6 between the inner cylinder 3 and the outer cylinder 4.

One end side of a piston rod 21 is inserted into the cylinder 2. The other end side of the piston rod 21 extends to the outside of the cylinder 2. The piston 18 is coupled to the one end side of this piston rod 21 disposed inside the cylinder 2. The piston 18 and the piston rod 21 integrally move. In an extension stroke in which the piston rod 21 increases a protrusion amount from the cylinder 2, the piston 18 moves to the upper chamber 19 side, and in a contraction stroke in which the piston rod 21 reduces the protrusion amount from the cylinder 2, the piston 18 moves to the lower chamber 20 side. The piston rod 21 penetrates the inside of the upper chamber 19 and does not penetrate the lower chamber 20. Thus, the upper chamber 19 is a rod-side chamber which the piston rod 21 penetrates, and the lower chamber 20 is a bottom-side chamber on the bottom member 12 side of the outer cylinder 4.

A rod guide 22 is fitted into an upper end opening side of the inner cylinder 3 and the outer cylinder 4. In the outer cylinder 4, a seal member 23 is fitted to the upper side that is an outward side of the cylinder 2 beyond the rod guide 22. Both the rod guide 22 and the seal member 23 have an annular shape. The piston rod 21 is slidably inserted through the inward side of each of the rod guide 22 and the seal member 23 and extends to the outside of the cylinder 2.

Here, the rod guide 22 guides movement of this piston rod 21 by supporting the piston rod 21 such that it can move in the axial direction while movement thereof in the radial direction of the cylinder is restricted. The seal member 23 is tightly adhered to the outer cylinder 4 in an outer circumferential portion thereof. An inner circumferential portion of the seal member 23 comes into slide contact with an outer circumferential portion of the piston rod 21 moving in the axial direction. Accordingly, oil inside the inner cylinder 3 and high-pressure gas and oil in the reservoir chamber 6 inside the outer cylinder 4 are prevented from leaking to the outside.

The rod guide 22 has a stepped shape in which the outer circumferential portion thereof has a larger diameter in an upper portion than in the lower portion. The rod guide 22 is fitted to the inner circumferential portion at an upper end of the inner cylinder 3 in the lower portion having a smaller diameter. The rod guide 22 is fitted to the inner circumferential portion in the upper portion of the outer cylinder 4 in the upper portion having a larger diameter. A base valve 25 for defining the lower chamber 20 and the reservoir chamber 6 is installed on the bottom member 12 of the outer cylinder 4. The inner circumferential portion at a lower end of the inner cylinder 3 is fitted to this base valve 25. An upper end portion of the outer cylinder 4 is swaged inward in the radial direction. This swaged part and the rod guide 22 sandwich the seal member 23 therebetween.

The piston rod 21 has a main shaft portion 27 and an attachment shaft portion 28 having a smaller diameter than this.

The attachment shaft portion 28 is disposed inside the cylinder 2, and the piston 18 and the like are attached thereto. An end portion of the main shaft portion 27 on the attachment shaft portion 28 side becomes a shaft stepped portion 29 extending in an axially orthogonal direction. In an outer circumferential portion of the attachment shaft portion 28, a male screw 31 is formed at a tip position on a side opposite to the main shaft portion 27 in the axial direction.

In the middle of the piston rod 21 in the radial direction, a hole 261 in the axial direction is formed from a tip surface of the attachment shaft portion 28 on a side opposite to the main shaft portion 27 to a predetermined intermediate position in the main shaft portion 27. In other words, the hole 261 is formed on an inner circumferential side of the piston rod 21. A pin member 262 supported on the base valve 25 side is inserted into this hole 261. A space between the hole 261 and the pin member 262 serves as a hollow chamber 263 in which oil can flow inside the piston rod 21. In other words, the hollow chamber 263 is formed by the hole 261 and the pin member 262 of the piston rod 21.

A radial hole 271, a radial hole 272, and a radial hole 273 are formed sequentially from the main shaft portion 27 side in the axial direction in the attachment shaft portion 28 of the piston rod 21. All these radial holes 271 to 273 are orthogonal to the hole 261 and penetrate the attachment shaft portion 28 in the radial direction. Thus, all the radial holes 271 to 273 communicate with the hollow chamber 263.

In the piston rod 21, a stopper member 281 and a pair of spring holders 282 and 283 all of which have a toric shape, and a rebound spring 284 constituted of a coil spring are provided at a part between the piston 18 of the main shaft portion 27 and the rod guide 22. The piston rod 21 is inserted through the inner circumferential side in the stopper member 281, which is swaged and fixed to a fixing groove 285 recessed inward in the radial direction from the outer circumferential surface of the main shaft portion 27. The spring holder 282 abuts the stopper member 281 and is fitted to one end of the rebound spring 284. The spring holder 283 is fitted to the other end of the rebound spring 284 and faces the rod guide 22.

In the shock absorber 1, for example, a protruding part of the piston rod 21 from the cylinder 2 is disposed in the upper portion and is supported by a vehicle body, and the attachment eye 13 on the cylinder 2 side is disposed in the lower portion and is coupled to a wheel side. On the contrary to this, the cylinder 2 side may be supported by the vehicle body, and the piston rod 21 may be coupled to the wheel side. When a wheel vibrates in accordance with traveling, positions of the cylinder 2 and the piston rod 21 relatively change due to the vibration, but the change is curbed by a fluid resistance in a flow channel formed in at least any one of the piston 18 and the piston rod 21. As will be described below in detail, the fluid resistance in the flow channel formed in at least any one of the piston 18 and the piston rod 21 is made to vary depending on a speed or an amplitude of vibration, and riding quality is improved by curbing vibration. In addition to vibration generated by the wheel in accordance with traveling of the vehicle, an inertial force or a centrifugal force generated in the vehicle body also acts between the cylinder 2 and the piston rod 21 described above. For example, a centrifugal force is generated in the vehicle body when a traveling direction changes by an operation of a steering wheel. A force based on this centrifugal force acts between the cylinder 2 and the piston rod 21 described above. As will be described below, the shock absorber 1 has favorable characteristics with respect to vibration based on a force generated in the vehicle body in accordance with traveling of the vehicle, and high stability in traveling of the vehicle is obtained.

Figure 2:
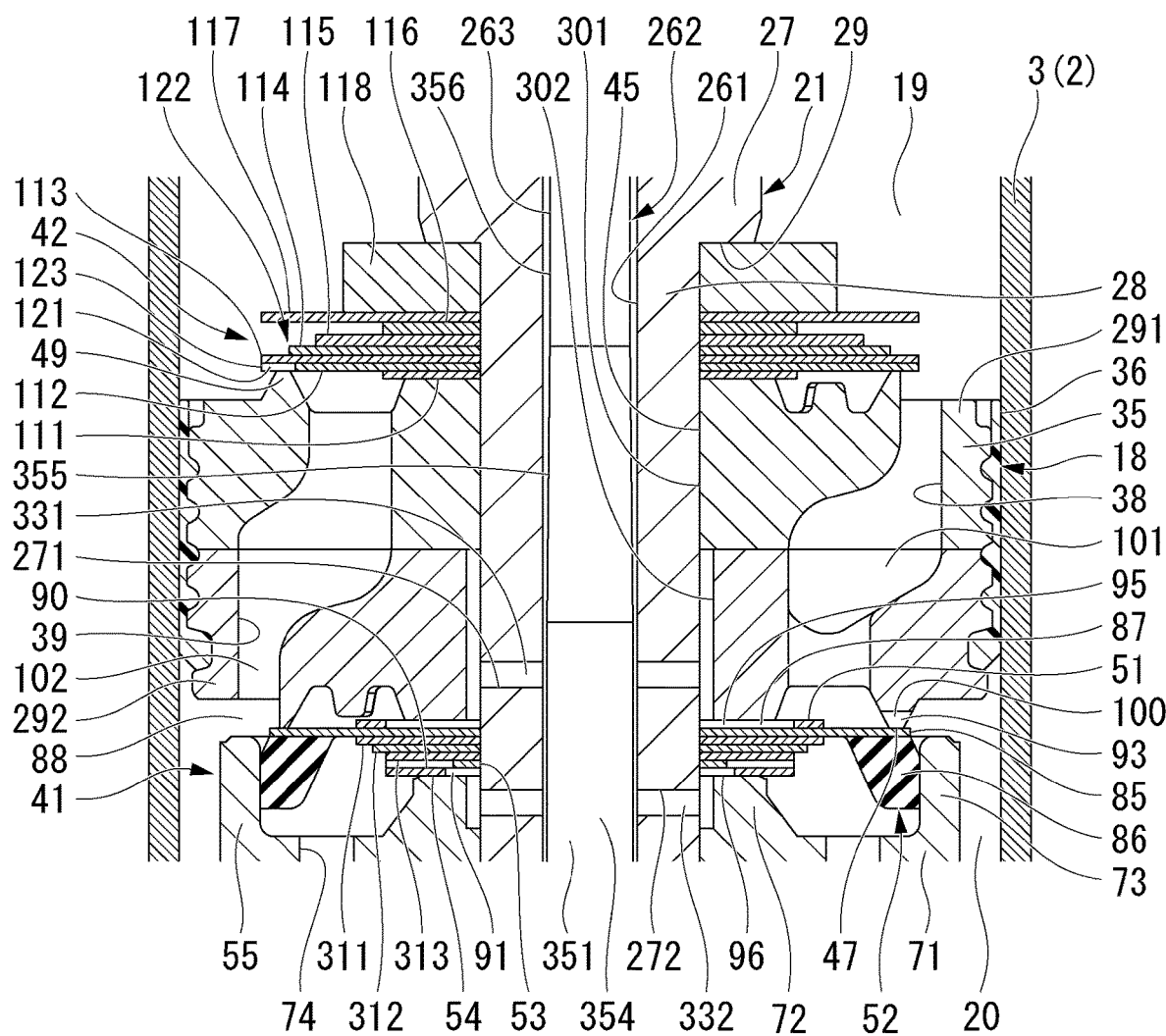
FIG. 2 is a partial cross-sectional view around a piston illustrating the shock absorber of the embodiment according to the present invention.

As illustrated in FIG. 2, the piston 18 is constituted of a metal piston main body 35 supported by the piston rod 21, and a synthetic resin slide member 36 having a toric shape integrally mounted on the outer circumferential surface of the piston main body 35 and sliding inside the inner cylinder 3.

The piston main body 35 is provided with a plurality of (in FIG. 2, only one is illustrated because it is a cross section) passage holes 38 which allow the upper chamber 19 and the lower chamber 20 to communicate with each other and in which a passage for the piston 18 moving to the upper chamber 19 side, namely, for oil flowing out from the upper chamber 19 toward the lower chamber 20 in the extension stroke is formed on the inward side, and a plurality of (in FIG. 2, only one is illustrated because it is a cross section) passage holes 39 in which a passage for the piston 18 moving to the lower chamber 20 side, namely, for oil flowing out from the lower chamber 20 toward the upper chamber 19 in the contraction stroke is formed on the inward side. Namely, the passages inside the plurality of passage holes 38 and the passages inside the plurality of passage holes 39 communicate with each other such that oil that is an operation fluid flows between the upper chamber 19 and the lower chamber 20 in response to movement of the piston 18. The passage holes 38 are formed at a uniform pitch in a circumferential direction with one passage hole 39 interposed therebetween, and one side of the piston 18 in the axial direction (the upper side in FIG. 2) opens to the outward side in the radial direction and the other side thereof in the axial direction (the lower side in FIG. 2) opens to the inward side in the radial direction.

Figure 3:
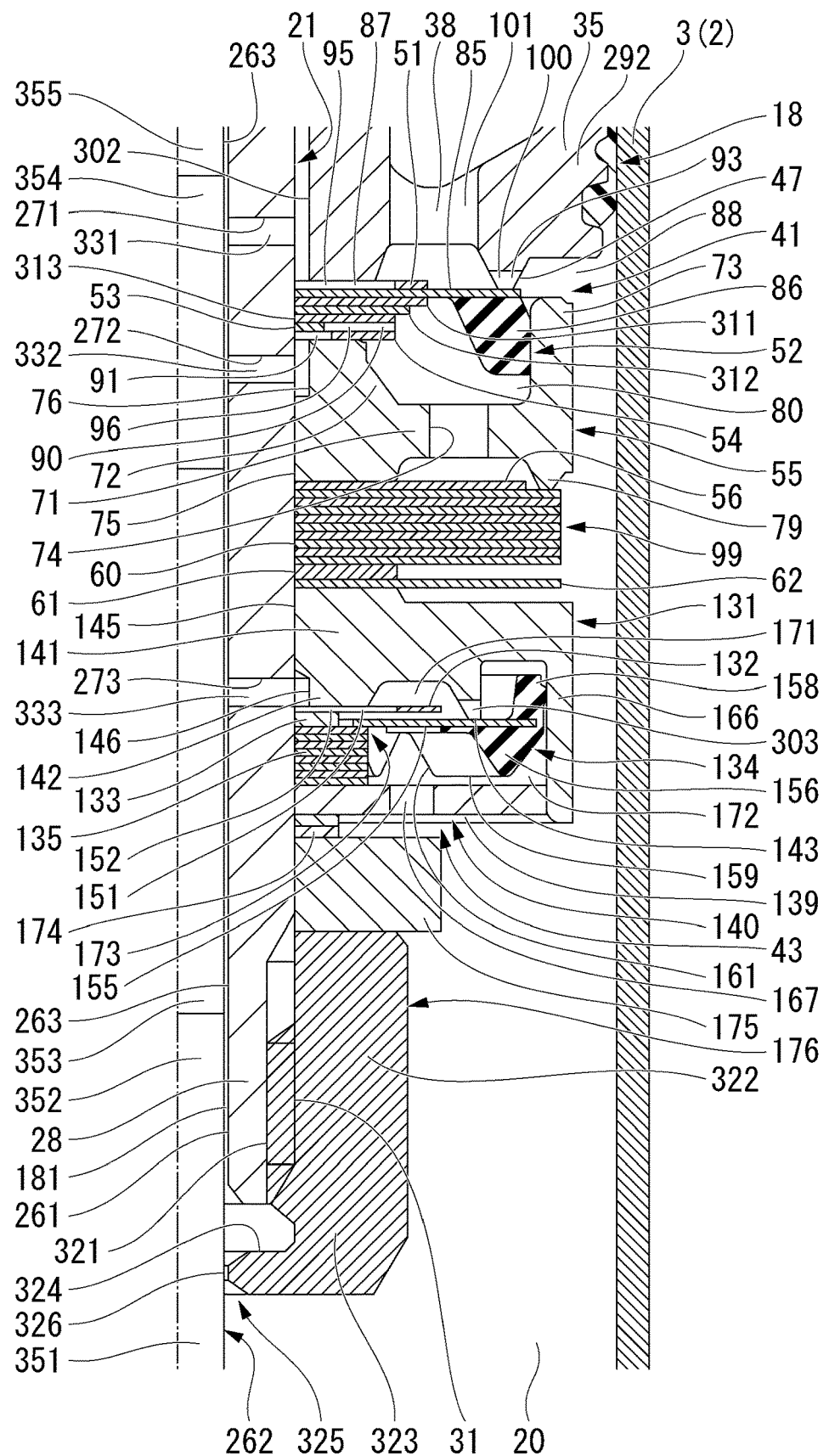
FIG. 3 is a partial cross-sectional view around an extension-side damping force generation mechanism and a frequency sensitive mechanism illustrating the shock absorber of the embodiment according to the present invention.

As illustrated in FIG. 3, a damping force generation mechanism 41 generating a damping force is provided for half of the passage holes 38. The damping force generation mechanism 41 is disposed on the lower chamber 20 side that is one end side of the piston 18 in the axial direction and is attached to the piston rod 21. The passage holes 38 form extension-side passages through which oil passes when the piston rod 21 and the piston 18 move to the extension side (the upper side in FIG. 3) on the inward side. The damping force generation mechanism 41 provided with respect to these serves as an extension-side damping force generation mechanism curbing a flow of oil through the passages inside the extension-side passage holes 38 and generating a damping force. A frequency sensitive mechanism 43 capable of varying a damping force by sensing a frequency of reciprocation of the piston 18 (which will hereinafter be referred to as a piston frequency) in the extension stroke while being adjacent to a side of the damping force generation mechanism 41 opposite to the piston 18 is attached to the attachment shaft portion 28 of the piston rod 21.

As illustrated in FIG. 2, the passage holes 39 constituting the remaining half are formed at a uniform pitch in the circumferential direction with one passage hole 38 interposed therebetween. In the passage holes 39 constituting the remaining half, the other side of the piston 18 in the axial direction (the lower side in FIG. 2) opens to the outward side in the radial direction, and one side thereof in the axial direction (the upper side in FIG. 2) opens to the inward side in the radial direction.

Further, a damping force generation mechanism 42 generating a damping force is provided for the remaining half of these passage holes 39. The damping force generation mechanism 42 is disposed on the upper chamber 19 side in the axial direction, that is, the other end side of the piston 18 in the axial direction and is attached to the piston rod 21. The passage holes 39 form contraction-side passages through which oil passes when the piston rod 21 and the piston 18 move to the contraction side (the lower side in FIG. 2) on the inward side. The damping force generation mechanism 42 provided with respect to these serves as a contraction-side damping force generation mechanism curbing a flow of oil through the passages inside the contraction-side passage holes 39 and generating a damping force.

The piston main body 35 has substantially a disk shape. A fitting hole 45 for fitting the attachment shaft portion 28 of the piston rod 21 is formed in the middle of the piston main body 35 in the radial direction in a manner of penetrating it in the axial direction. In the end portion of the piston main body 35 on the lower chamber 20 side in the axial direction, a part between the fitting hole 45 and the passage holes 38 supports the inner circumferential side of the damping force generation mechanism 41. In the end portion of the piston main body 35 on the upper chamber 19 side in the axial direction, a part between the fitting hole 45 and the passage holes 39 supports the inner circumferential side of the damping force generation mechanism 42.

In the end portion of the piston main body 35 on the lower chamber 20 side in the axial direction, an annular valve seat portion 47 that is a part of the damping force generation mechanism 41 is formed on the outward side in the radial direction from openings of the passage holes 38 on the lower chamber 20 side. A cutout 93 penetrating it in the radial direction is formed in the valve seat portion 47. In addition, in the end portion of the piston main body 35 on the upper chamber 19 side in the axial direction, an annular valve seat portion 49 that is a part of the damping force generation mechanism 42 is formed on the outward side in the radial direction from openings of the passage holes 39 on the upper chamber 19 side.

Here, the piston main body 35 is constituted of combination of a constituent body 291 on the upper chamber 19 side in the axial direction and a constituent body 292 on the lower chamber 20 side in the axial direction. The constituent bodies 291 and 292 are in a positionally set state in the radial direction and the circumferential direction, and a sliding member 36 is wound around these in this state. In this state, the constituent bodies 291 and 292 are integrated. The valve seat portion 49 is formed in the constituent body 291, and the valve seat portion 47 is formed in the constituent body 292.

The fitting hole 45 of the piston main body 35 has a small diameter hole portion 301 formed in the constituent body 291 and fitting the attachment shaft portion 28 of the piston rod 21, and a large diameter hole portion 302 formed in the constituent body 292, having a larger diameter than the small diameter hole portion 301, and forming a gap in the radial direction with respect to the attachment shaft portion 28. The radial hole 271 of the piston rod 21 aligns the position of the piston rod 21 in the axial direction with the large diameter hole portion 302 of the piston 18. The radial hole 271 of the piston rod 21 faces the large diameter hole portion 302 in the radial direction of the piston rod 21.

In the piston main body 35, a side of the valve seat portion 47 opposite to the fitting hole 45 has a stepped shape of which the height in the axial direction is lower than the valve seat portion 47. The openings of the contraction-side passages holes 39 on the lower chamber 20 side are disposed at this stepped part. Similarly, in the piston main body 35, a side of the fitting hole 45 opposite to the valve seat portion 49 has a stepped shape of which the height in the axial direction is lower than the valve seat portion 49. The openings of the extension-side passage holes 38 on the upper chamber 19 side are disposed at this stepped part.

As illustrated in FIG. 3, the extension-side damping force generation mechanism 41 is a pressure control-type valve mechanism. The extension-side damping force generation mechanism 41 has one disk 51, one main valve 52 (first valve), one disk 311, one disk 312, one disk 313, one disk 53, one disk 54, one sheet member 55, one disk 56, a plurality of disks 60, one disk 61, and one disk 62 sequentially from the piston 18 side in the axial direction. The disks 51, 53, 54, 56, 60 to 62, and 311 to 313 and the sheet member 55 are made of a metal. All the disks 51, 53, 54, 56, 60 to 62, and 311 to 313 have a circular plate shape with a hole having a uniform thickness in which the attachment shaft portion 28 of the piston rod 21 can be fitted on the inward side. Both the main valve 52 and the sheet member 55 have a toric shape in which the attachment shaft portion 28 of the piston rod 21 can be fitted on the inward side.

The sheet member 55 has a bottom portion 71 having a disk shape with a hole extending in the axially orthogonal direction, an inner cylindrical portion 72 formed on the inner circumferential side of the bottom portion 71 and having a cylindrical shape in the axial direction, and an outer cylindrical portion 73 formed on the outer circumferential side of the bottom portion 71 and having a cylindrical shape in the axial direction. The bottom portion 71 is shifted to one side in the axial direction with respect to the inner cylindrical portion 72 and the outer cylindrical portion 73. A penetration hole 74 is formed in the bottom portion 71 in a manner of penetrating it in the axial direction. On the inward side of the inner cylindrical portion 72, a small diameter hole portion 75 for fitting the attachment shaft portion 28 of the piston rod 21 is formed on the bottom portion 71 side in the axial direction. On the inward side of the inner cylindrical portion 72, a large diameter hole portion 76 having a larger diameter than the small diameter hole portion 75 is formed on a side opposite to the bottom portion 71 in the axial direction. The radial hole 272 of the piston rod 21 aligns the position of the piston rod 21 in the axial direction with the large diameter hole portion 76 of the sheet member 55. The radial hole 272 of the piston rod 21 faces the large diameter hole portion 76 in the radial direction of the piston rod 21.

The end portion of the inner cylindrical portion 72 of the sheet member 55 on the bottom portion 71 side in the axial direction supports the inner circumferential side of the disk 56. The end portion of the inner cylindrical portion 72 on a side opposite to the bottom portion 71 in the axial direction supports the inner circumferential side of the disk 54. The end portion of the outer cylindrical portion 73 of the sheet member 55 on the bottom portion 71 side in the axial direction serves as an annular valve seat portion 79. The inward side of the sheet member 55 serves as a back pressure chamber 80 including the penetration hole 74 and applying a pressure to the main valve 52 in a direction of the piston 18.

The disk 51 has an outer diameter smaller than an inner diameter of the valve seat portion 47. A cutout 87 extending to the inner circumferential side in the radial direction is formed in the disk 51. The inside of the cutout 87 constitutes an orifice 95.

The main valve 52 is constituted of a metal disk 85 and a rubber seal member 86 fixedly attached to the disk 85. The disk 85 has a circular plate shape with a hole having a uniform thickness in which the attachment shaft portion 28 of the piston rod 21 can be fitted on the inward side and has an outer diameter slightly larger than an outer diameter of the valve seat portion 47. The seal member 86 is fixedly attached to the outer circumferential side of the disk 85 opposite to the piston 18 in the axial direction and has a toric shape.

The disk 85 can be seated in the valve seat portion 47 of the piston 18. The main valve 52 is provided between the passages inside the passage holes 38 provided in the piston 18 and the back pressure chamber 80 provided in the sheet member 55. Accordingly, a flow of oil generated in response to sliding of the piston 18 to the extension side is curbed and a damping force is generated. This main valve 52 serves as a disk valve.

The seal member 86 comes into contact with an inner circumferential surface of the outer cylindrical portion 73 of the sheet member 55 throughout the whole circumference and seals a gap between the main valve 52 and the outer cylindrical portion 73. Thus, the foregoing back pressure chamber 80 between the main valve 52 and the sheet member 55 causes an inner pressure to act on the main valve 52 in the direction of the piston 18, namely, a valve-closed direction in which the disk 85 is seated in the valve seat portion 47.

The disk 311 has a smaller diameter than an inner diameter of the seal member 86. The disk 312 has an outer diameter smaller than an outer diameter of the disk 311. The disk 313 has an outer diameter smaller than an outer diameter of the disk 312. The disk 53 has an outer diameter equivalent to an outer diameter of the disk 313, and a cutout 90 is formed on the outer circumferential side. The disk 54 has an outer diameter equivalent to an outer diameter of the disk 53. In the disk 54, a cutout 91 is formed on the inner circumferential side. The cutout 91 communicates with the cutout 90 of the disk 53 at all times. The passage inside the large diameter hole portion 76 of the sheet member 55 and the back pressure chamber 80 communicate with each other at all times via the passage inside the cutout 91 and the passage inside the cutout 90. The passage inside the cutout 91 and the passage inside the cutout 90 constitute an orifice 96.

The orifice 95 inside the cutout 87 of the disk 51, the passage inside the large diameter hole portion 302 of the piston 18, the passage inside the radial hole 271 of the piston rod 21, the hollow chamber 263, the passage inside the radial hole 272 of the piston rod 21, the passage inside the large diameter hole portion 76 of the sheet member 55, and the orifice 96 inside the cutouts 91 and 90 of the disks 54 and 53 serve as passages for introducing oil into the back pressure chamber 80 from the upper chamber 19 inside the cylinder 2 via the passages inside the passage holes 38.

The main valve 52 is a pilot-type damping valve having the back pressure chamber 80. When the disk 85 is separated from the valve seat portion 47 of the piston 18 and opens, oil from the passages inside the passage holes 38 flows to the lower chamber 20 via a passage 88 extending in the radial direction between the piston 18 and the outer cylindrical portion 73 of the sheet member 55. Namely, the extension-side damping force generation mechanism 41 introduces a part of a flow of oil to the back pressure chamber 80 via the orifice 95 inside the cutout 87 of the disk 51, the passage inside the large diameter hole portion 302 of the piston 18, the passage inside the radial hole 271 of the piston rod 21, the hollow chamber 263, the passage inside the radial hole 272 of the piston rod 21, and the orifice 96 inside the cutouts 91 and 90 of the disks 54 and 53 and controls opening of the main valve 52 by means of a pressure of the back pressure chamber 80. The cutout 93 of the valve seat portion 47 constitutes a fixing orifice 100 causing the back pressure chamber 80 to communicate with the lower chamber 20 even if the main valve 52 is in a state of abutting the valve seat portion 79.

The disk 56 has an outer diameter smaller than an inner diameter of the valve seat portion 79 of the sheet member 55. The plurality of disks 60 have an outer diameter slightly larger than an outer diameter of the valve seat portion 79 and can be seated in the valve seat portion 79. The disk 61 has an outer diameter smaller than an outer diameter of the disk 60. The disk 62 has an outer diameter equivalent to the outer diameter of the disk 60.

The plurality of disks 60 can be separated and seated with respect to the valve seat portion 79. The plurality of disks 60 cause the back pressure chamber 80 and the lower chamber 20 to communicate with each other by being separated from the valve seat portion 79 and constitute a hard valve 99 for curbing a flow of oil therebetween. The back pressure chamber 80 is formed by being surrounded by the main valve 52, the disks 311 to 313, 53, and 54, the sheet member 55, the disk 56, and the hard valve 99.

The passages inside the extension-side passage holes 38 provided in the piston 18, a gap between the main valve 52 when being opened and the valve seat portion 47, and the passage 88 extending in the radial direction between the piston 18 and the outer cylindrical portion 73 constitute an extension-side first passage 101 through which oil flows out from the upper chamber 19 toward the lower chamber 20 in response to movement of the piston 18 in the extension stroke. The first passage 101 is formed in the piston 18. The extension-side damping force generation mechanism 41 is provided in this extension-side first passage 101 and generates a damping force. The extension-side damping force generation mechanism 41 has the main valve 52 provided in this extension-side first passage 101 and generating a damping force, and the back pressure chamber 80 applying a back pressure to the main valve 52.

As illustrated in FIG. 2, the contraction-side damping force generation mechanism 42 has one disk 111, one disk 112, one disk 113, one disk 114, one disk 115, one disk 116, one disk 117, and one annular member 118 sequentially from the piston 18 side in the axial direction. The disks 111 to 117 and the annular member 118 are made of a metal, and all of them have a circular plate shape with a hole having a uniform thickness in which the attachment shaft portion 28 of the piston rod 21 can be fitted on the inward side.

The disk 111 has an outer diameter smaller than an inner diameter of the valve seat portion 49 of the piston 18. The disk 112 has an outer diameter slightly larger than an outer diameter of the valve seat portion 49 of the piston 18. The disk 112 can be seated in the valve seat portion 49. In the disk 112, a cutout 121 is formed on the outer circumferential side. The cutout 121 traverses the valve seat portion 49 in the radial direction.

The disk 113 has the same outer diameter as an outer diameter of the disk 112. The disk 114 has an outer diameter smaller than an outer diameter of the disk 113. The disk 115 has an outer diameter smaller than an outer diameter of the disk 114. The disk 116 has an outer diameter smaller than an outer diameter of the disk 115. The disk 117 has an outer diameter equivalent to the outer diameter of the disk 113. The annular member 118 has an outer diameter smaller than an outer diameter of the disk 117 and is thicker and has a higher rigidity than the disks 111 to 117. This annular member 118 abuts the shaft stepped portion 29 of the piston rod 21.

The disks 112 to 115 can be separated and seated with respect to the valve seat portion 49. The disks 112 to 115 cause the passages inside the passage holes 39 to be able to be released to the upper chamber 19 by being separated from the valve seat portion 49 and constitute a disk valve 122 for curbing a flow of oil between the lower chamber 20 and the upper chamber 19. The cutout 121 of the disk 112 constitutes a fixing orifice 123 causing the upper chamber 19 and the lower chamber 20 to communicate with each other even if the disk 112 is in a state of abutting the valve seat portion 49. The disk 117 and the annular member 118 restrict deformation of the disk valve 122 in an opening direction beyond a stipulated limit.

The passages inside the contraction-side passage holes 39 provided in the piston 18, the fixing orifice 123, and a gap between the disk valve 122 when being opened and the valve seat portion 49 constitute a contraction-side first passage 102 through which oil flows out from the lower chamber 20 toward the upper chamber 19 in response to movement of the piston 18 in the contraction stroke. The first passage 102 is formed in the piston 18. The contraction-side damping force generation mechanism 42 is provided in this contraction-side first passage 102 and generates a damping force.

In the present embodiment, an inner circumferential clamp disk valve has been exemplified for both the extension-side hard valve 99 illustrated in FIG. 3 and the contraction-side disk valve 122 illustrated in FIG. 2, but it is not limited thereto. It need only be a mechanism for generating a damping force. For example, it may be a lift-type valve biasing the disk valve using a coil spring or may be a poppet valve.

As illustrated in FIG. 3, the frequency sensitive mechanism 43 has one case member main body 131, one disk 132, one disk 133 and one dividing disk 134 (flexible member), a plurality of disks 135, and one lid member 139 sequentially from the damping force generation mechanism 41 side in the axial direction. The case member main body 131, the disks 132, 133, and 135, and the lid member 139 are made of a metal. All the disks 132, 133, and 135 and the lid member 139 have a circular plate shape with a hole having a uniform thickness in which the attachment shaft portion 28 of the piston rod 21 can be fitted on the inward side. The case member main body 131 has a toric shape in which the attachment shaft portion 28 of the piston rod 21 can be fitted on the inward side. The case member main body 131 curbs deformation of the hard valve 99 together with the disk 62 when the hard valve 99 is deformed in the opening direction.

The lid member 139 is fitted to the case member main body 131 and constitutes a tubular case member 140 together with the case member main body 131. The case member main body 131 has a base portion 141 having a disk shape with a hole in the axially orthogonal direction, an inner cylindrical portion 142 formed on the inner circumferential side of the base portion 141 and having a tubular shape in the axial direction, and a seat portion 143 formed on the outer circumferential side from the inner cylindrical portion 142 of the base portion 141 and having a tubular shape in the axial direction. The case member main body 131 has a tubular portion 166 having a cylindrical shape on the outer circumferential side from the seat portion 143 of the base portion 141.

The inner cylindrical portion 142 protrudes from the base portion 141 to both sides in the axial direction, and the seat portion 143 protrudes from the base portion 141 to only one side in the axial direction. The tubular portion 166 protrudes from the base portion 141 to the same side as the seat portion 143 in the axial direction. The tubular portion 166 has a height from the base portion 141 in the axial direction higher than the seat portion 143. On the inward side of the inner cylindrical portion 142, a small diameter hole portion 145 for fitting the attachment shaft portion 28 of the piston rod 21 is formed on a side opposite in a protrusion direction of the seat portion 143 in the axial direction. On the inward side of the inner cylindrical portion 142, a large diameter hole portion 146 having a larger diameter than the small diameter hole portion 145 is formed on the seat portion 143 side in the axial direction. The radial hole 273 aligns the position of the piston rod 21 in the axial direction with the large diameter hole portion 146. The radial hole 273 faces the large diameter hole portion 146 in the radial direction.

The inner cylindrical portion 142 of the case member main body 131 supports the inner circumferential side of the disk 62 in one end portion thereof on the small diameter hole portion 145 side in the axial direction. The inner cylindrical portion 142 of the case member main body 131 supports the inner circumferential side of the disk 132 in the other end portion thereof on the large diameter hole portion 146 side in the axial direction. The seat portion 143 of the case member main body 131 supports the outer circumferential side of the dividing disk 134 in an end portion thereof on a protruding tip side. In the seat portion 143, a cutout 303 is formed partially in the circumferential direction. Thus, the inward side of the seat portion 143 in the radial direction and the outward side thereof in the radial direction in the case member main body 131 communicate with each other at all times.

The disk 132 has an outer diameter larger than a part of the inner cylindrical portion 142 coming into contact with this and smaller than an inner diameter of the seat portion 143. In the disk 132, a cutout 151 is formed on the inner circumferential side. The cutout 151 traverses a part of the inner cylindrical portion 142 coming into contact with the disk 132 in the radial direction. The inside of the cutout 151 constitutes an orifice 152. The disk 133 has an outer diameter smaller than an outer diameter of the disk 132.

The dividing disk 134 is constituted of a metal disk 155 and a rubber seal member 156 fixedly attached to the outer circumferential side of the disk 155. The dividing disk 134 can be elastically deformed. The dividing disk 134 is disposed inside the case member 140 and can flex inside the case member 140. The disk 155 has a circular plate shape with a hole having a uniform thickness, in which the disk 133 can be disposed on the inward side with a gap in the radial direction, and has a thickness smaller than the disk 133. The disk 155 has an outer diameter larger than an outer diameter of the seat portion 143 of the case member main body 131.

The seal member 156 has a toric shape and is fixedly attached to the outer circumferential side of the disk 155. The seal member 156 has a toric seal main body portion 158 protruding from the disk 155 to a side opposite to the lid member 139 in the axial direction, and a protrusion portion 159 protruding from the disk 155 to the lid member 139 side in the axial direction. An annular gap is provided between the disk 155 and the tubular portion 166 of the case member main body 131 in the radial direction. The seal member 156 fixedly attaches the seal main body portion 158 and the protrusion portion 159 to both surfaces of the disk 155 via the gap. Due to such a constitution, the seal member 156 is easily fixedly attached to the disk 155. The seal main body portion 158 comes into contact with the tubular portion 166 throughout the whole circumference. In the seal main body portion 158, the inner diameter of the end portion on the disk 155 side having the smallest inner diameter is slightly larger than an outer diameter of the seat portion 143. Accordingly, in the dividing disk 134, the disk 155 thereof abuts the seat portion 143 of the case member main body 131 and is seated therein. A radial groove 161 penetrating the protrusion portion 159 in the radial direction is formed therein. Since a cutout 303 is provided in the seat portion 143, a pressure receiving surface on a side where the seal main body portion 158 of the disk 155 is provided and a pressure receiving surface on a side where the protrusion portion 159 is provided become approximately the same.

The disk 135 has an outer diameter larger than an inner diameter of the disk 155 of the dividing disk 134. Accordingly, in the dividing disk 134, the inner circumferential side is supported by the disk 135 in the axial direction. In the dividing disk 134, the annular seal member 156 for sealing a space between the dividing disk 134 and the case member 140 is provided on the outer circumferential side that is a non-support side. In the dividing disk 134, the seal main body portion 158 of the seal member 156 comes into contact with the tubular portion 166 of the case member 140 and is centered with respect to the case member 140. In other words, the inner circumferential side of the dividing disk 134 has a simple support structure which is not clamped from both surface sides and in which only one surface side is supported by the disk 135. In the dividing disk 134, a side opposite to the disk 135 in the axial direction on the outer circumferential side of the disk 155 is supported by the seat portion 143. The inner circumferential side of the dividing disk 134 can move in the axial direction within a range between the disk 132 and the disk 135.

The lid member 139 has a disk shape with a hole in which the attachment shaft portion 28 of the piston rod 21 can be fitted on the inward side. The lid member 139 is fitted into the tubular portion 166 of the case member main body 131. A penetration hole 167 penetrating the lid member 139 in the axial direction is formed in an intermediate portion in the radial direction. The penetration hole 167 is formed at a position on the outward side in the radial direction from the disk 135 in the lid member 139. The penetration hole 167 is formed on the inward side, of the seal member 156 coming into contact with the lid member 139 when the disk 155 warps, in the radial direction from the protrusion portion 159.

The seal main body portion 158 of the dividing disk 134 comes into contact with the inner circumferential surface of the tubular portion 166 of the case member main body 131 throughout the whole circumference and seals a gap between the dividing disk 134 and the tubular portion 166. Namely, the dividing disk 134 is a packing valve. The seal main body portion 158 seals the gap between the dividing disk 134 and the tubular portion 166 throughout the whole circumference at all times even if the dividing disk 134 is deformed within a range allowed inside the case member 140. The dividing disk 134 is centered with respect to the case member 140 when the seal main body portion 158 comes into contact with the tubular portion 166 throughout the whole circumference.

The dividing disk 134 divides the inside of the case member 140 into a variable capacitance chamber 171 of which a capacitance on the base portion 141 side of the case member main body 131 is variable, and a variable capacitance chamber 172 of which a capacitance on the lid member 139 side is variable. In other words, the variable capacitance chambers 171 and 172 are defined by the dividing disk 134 that is a flexible member and is provided inside the case member 140. The variable capacitance chamber 171 communicates with the passage inside the large diameter hole portion 146 of the case member main body 131 via the orifice 152 inside the cutout 151 of the disk 132. The variable capacitance chamber 172 communicates with the lower chamber 20 via the passage inside the penetration hole 167 of the lid member 139.

The dividing disk 134 and the disk 135 constitute a check valve 173 restricting a flow of oil from the variable capacitance chamber 171 to the variable capacitance chamber 172 by abutting each other, while allowing a flow of oil from the variable capacitance chamber 172 to the variable capacitance chamber 171 by being separated from each other.

In the frequency sensitive mechanism 43 having the foregoing constitution, regardless of a movement speed (which will hereinafter be referred to as a piston speed) of the piston 18, a damping force is variable such that a damping force when the piston frequency is at a low frequency becomes greater than a damping force during a high frequency.

In the piston rod 21, in a state in which the attachment shaft portion 28 is individually inserted through the inward side thereof, as illustrated in FIG. 2, the annular member 118, the disk 117, the disk 116, the disk 115, the disk 114, the disk 113, the disk 112, the disk 111, the piston 18, the disk 51, the main valve 52, the disk 311, the disk 312, the disk 313, the disk 53, and the disk 54 overlap the shaft stepped portion 29 in this order. Moreover, as illustrated in FIG. 3, in a state in which the attachment shaft portion 28 is individually inserted through the inward side thereof, the sheet member 55, the disk 56, the plurality of disks 60, the disk 61, the disk 62, the case member main body 131, the disk 132, and the disk 133 overlap the disk 54 in this order. At this time, the sheet member 55 causes the seal member 86 of the main valve 52 to be fitted to the outer cylindrical portion 73.

In addition, in a state in which the disk 133 is inserted through the inward side, the dividing disk 134 overlaps the seat portion 143 of the case member main body 131. At this time, the dividing disk 134 is fitted to the tubular portion 166 of the case member main body 131. Moreover, in a state in which the attachment shaft portion 28 is individually inserted through the inward side thereof, the plurality of disks 135 and the lid member 139 overlap the disk 133 and the dividing disk 134 in this order. At this time, the lid member 139 is fitted into the tubular portion 166 of the case member main body 131. Furthermore, a plurality of disks 174 having an outer diameter which does not block the penetration hole 167 of the lid member 139 and an annular member 175 that is a common component shared with the annular member 118 allow the attachment shaft portion 28 to be inserted through the inward side thereof and overlap the lid member 139.

In this manner, in a state in which a component is disposed, a nut 176 (tightening member) is screwed into the male screw 31 of the attachment shaft portion 28 protruding beyond the annular member 175. In this state, the inner circumferential side or the entirety of each of the annular member 118, the disks 117, 116, 115, 114, 113, 112, and 111, the piston 18, the disk 51, the main valve 52, the disks 311, 312, 313, 53, and 54, and the sheet member 55 illustrated in FIG. 2; and the disk 56, the plurality of disks 60, the disks 61 and 62, the case member main body 131, the disks 132 and 133, the plurality of disks 135, the lid member 139, the plurality of disks 174, and the annular member 175 illustrated in FIG. 3 is sandwiched by the shaft stepped portion 29 of the piston rod 21 and the nut 176 and is clamped in the axial direction. At this time, in the dividing disk 134, the inner circumferential side is not clamped in the axial direction.

Namely, in a state in which the piston rod 21 is inserted through the inner circumferential side of each of the contraction-side damping force generation mechanism 42 illustrated in FIG. 2, the piston 18, the extension-side damping force generation mechanism 41 illustrated in FIG. 3, and the extension-side frequency sensitive mechanism 43, they are fastened to the piston rod 21 using the nut 176. In other words, in a state in which the piston rod 21 is inserted through the inner circumferential sides of the piston 18, the case member main body 131 constituting the frequency sensitive mechanism 43, the disks 132 and 133, the plurality of disks 135, and the lid member 139, they are fastened to the piston rod 21 using the nut 176. In a state in which the frequency sensitive mechanism 43 is assembled in advance, it can be assembled in the piston rod 21. In that case, a dummy rod is inserted therethrough in place of the piston rod 21, and the attachment shaft portion 28 of the piston rod 21 is inserted through the inner circumferential side of the frequency sensitive mechanism 43 while pulling this rod. When the frequency sensitive mechanism 43 is in an assembled state in advance, the lid member 139 can be press-fitted and fixed to the tubular portion 166 of the case member main body 131.

The nut 176 has a hexagonal nut main body portion 322 having a female screw 321 screwed to the male screw 31 of the piston rod 21, a toric protrusion portion 323 protruding in the axial direction from the nut main body portion 322, and a toric inner flange portion 324 protruding inward in the radial direction from the whole circumference at the end portion of the protrusion portion 323 on a side opposite to the nut main body portion 322 in the axial direction. The pin member 262 is inserted through the inward side of the inner flange portion 324. The inner diameter of the inner flange portion 324 has a smaller diameter than an inner diameter of the hole 261. A gap between the inner flange portion 324 and the pin member 262 has a toric shape. This gap serves as an orifice 326 (sixth passage). The orifice 326 causes the hollow chamber 263 and the lower chamber 20 to communicate with each other. Here, the pin member 262 has a part of which the outer diameter varies depending on the position in the axial direction. Thus, in the orifice 326, an orifice area can be changed depending on the nut 176 with respect to the cylinder 2, that is, the relative position of the piston 18.

The inner flange portion 324 and the pin member 262 constitute a variable orifice mechanism 325 in which the orifice area can be changed depending on the relative position of the piston 18 with respect to the cylinder 2. Instead of forming the inner flange portion 324 in the nut 176, a variable orifice mechanism may be formed by press-fitting a bushing into the lower end portion of the hole 261 of the piston rod 21.

In a state of being attached to the piston rod 21 as described above, the orifice 95 inside the cutout 87 of the disk 51, the passage inside the large diameter hole portion 302 of the piston 18, the passage inside the radial hole 271 of the piston rod 21, the hollow chamber 263, the passage inside the radial hole 272 of the piston rod 21, the passage inside the large diameter hole portion 76 of the sheet member 55 of the damping force generation mechanism 41, the passage inside the radial hole 273 of the piston rod 21, and the passage inside the large diameter hole portion 146 of the case member main body 131 of the frequency sensitive mechanism 43 communicate with each other. Accordingly, the back pressure chamber 80 communicates with the variable capacitance chamber 171 of the frequency sensitive mechanism 43 at all times via the orifice 96 inside the cutouts 90 and 91 of the disks 53 and 54, the passage inside the large diameter hole portion 76 of the sheet member 55, the passage inside the radial hole 272 of the piston rod 21, the hollow chamber 263, the passage inside the radial hole 273 of the piston rod 21, the passage inside the large diameter hole portion 146 of the case member main body 131, and the orifice 152 inside the cutout 151 of the disk 132. The variable capacitance chamber 172 of the frequency sensitive mechanism 43 communicates with the lower chamber 20 at all times via the penetration hole 167 of the lid member 139. The hollow chamber 263 communicates with the lower chamber 20 at all times via the orifice 326 of the variable orifice mechanism 325.

The orifice 95 inside the cutout 87 provided in the disk 51, the passage inside the large diameter hole portion 302 of the piston 18, the passage inside the radial hole 271 of the piston rod 21, the hollow chamber 263, the passage inside the radial hole 272 of the piston rod 21, the passage inside the large diameter hole portion 76 of the sheet member 55, the orifice 96 inside the cutouts 91 and 90 of the disks 54 and 53, the back pressure chamber 80, a gap between the hard valve 99 when being opened and the valve seat portion 79, the orifice 326 inside the variable orifice mechanism 325, the passage inside the radial hole 273 of the piston rod 21, the passage inside the large diameter hole portion 146 of the case member main body 131, the orifice 152 inside the cutout 151 of the disk 132, the variable capacitance chambers 171 and 172, and the passage inside the penetration hole 167 of the lid member 139 branch from the foregoing extension-side first passage 101 and constitute an extension-side second passage 181 provided in parallel to the first passage 101 after branching. The orifice 95 that is an introduction portion for oil to the second passage 181 serves as a common introduction orifice shared by the variable orifice mechanism 325, the frequency sensitive mechanism 43, and the back pressure chamber 80 of the damping force generation mechanism 41.

The shock absorber 1 supplies oil in the upper chamber 19 to the second passage 181 via the first passage 101 formed in the piston 18. The second passage 181 branches from the first passage 101 via the orifice 95 inside the cutout 87 formed by the disk 51 abutting the piston 18. In other words, the second passage 181 branches from the first passage 101 via the orifice 95 formed by the disk 51 abutting the piston 18. Two variable capacitance chambers 171 and 172 which are at least a part of the second passage 181 are provided inside the case member 140 by being defined by the dividing disk 134. The frequency sensitive mechanism 43 and the variable orifice mechanism 325 are provided in this second passage 181.

The inside of the radial hole 271 of the piston rod 21 serves as a third passage 331 for supplying oil in the upper chamber 19 to the hollow chamber 263 in a state not changing depending on the relative position between the cylinder 2 and the piston 18. The inside of the radial hole 272 of the piston rod 21 serves as a fourth passage 332 for supplying oil to the back pressure chamber 80 from the hollow chamber 263. The inside of the radial hole 273 of the piston rod 21 serves as a fifth passage 333 for supplying oil to the variable capacitance chamber 171 of the case member 140 from the hollow chamber 263. The orifice 326 inside the variable orifice mechanism 325 supplies oil to the lower chamber 20 from the hollow chamber 263 via the nut 176. The third passage 331, the fourth passage 332, the fifth passage 333, and the orifice 326 communicate with the hollow chamber 263. The third passage 331, the fourth passage 332, the fifth passage 333, and the orifice 326 constitute the second passage 181. The orifice 326 that is at least a part of the second passage 181 is formed inside the nut 176.

The dividing disk 134 can be deformed within a range in which the inner circumferential side moves between the disk 132 and the disk 135 and the outer circumferential side moves between the seat portion 143 and the lid member 139. Here, the shortest distance in the axial direction between the seat portion 143 supporting the outer circumferential side of the disk 155 of the dividing disk 134 from one side in the axial direction and the disk 135 supporting the inner circumferential side of the disk 155 from the other side in the axial direction is smaller than the thickness of the disk 155 in the axial direction. Thus, when the variable capacitance chambers 171 and 172 are under the same pressure, the disk 155 is press-fitted to the seat portion 143 and the disk 135 throughout the whole circumference due to an elastic force of itself in a slightly deformed state. The dividing disk 134 blocks circulation of oil between the variable capacitance chambers 171 and 172 of the second passage 181 in a state in which the inner circumferential side thereof comes into contact with the disk 135 throughout the whole circumference. The dividing disk 134 allows circulation of oil between the variable capacitance chambers 171 and 172 of the second passage 181 in a state in which the inner circumferential side thereof is separated from the disk 135.

The dividing disk 134 blocks circulation of oil between the variable capacitance chambers 171 and 172 in the extension stroke and allows circulation of oil between the variable capacitance chambers 172 and 171 in the contraction stroke.

As illustrated in FIG. 1, the pin member 262 has a support flange portion 350 supported by the base valve 25, and a pin shaft portion 351 having a smaller diameter than the support flange portion 350 and extending in the axial direction from the support flange portion 350. The pin shaft portion 351 has a large diameter shaft portion 352 extending in the axial direction from the support flange portion 350, a first tapered shaft portion 353 extending in the axial direction from a side of the large diameter shaft portion 352 opposite to the support flange portion 350, an intermediate diameter shaft portion 354 extending in the axial direction from a side of the first tapered shaft portion 353 opposite to the large diameter shaft portion 352, a second tapered shaft portion 355 extending in the axial direction from a side of the intermediate diameter shaft portion 354 opposite to the first tapered shaft portion 353, and a small diameter shaft portion 356 extending in the axial direction from a side of the second tapered shaft portion 355 opposite to the intermediate diameter shaft portion 354.

The large diameter shaft portion 352 has a straight columnar shape with a uniform outer diameter, and the intermediate diameter shaft portion 354 has a straight columnar shape with a uniform outer diameter smaller than the large diameter shaft portion 352. The small diameter shaft portion 356 has a straight columnar shape with a uniform outer diameter smaller than the intermediate diameter shaft portion 354. The first tapered shaft portion 353 connects the large diameter shaft portion 352 and the intermediate diameter shaft portion 354 to each other and has a tapered shape in which the intermediate diameter shaft portion 354 side has a smaller outer diameter than the large diameter shaft portion 352 side. The second tapered shaft portion 355 connects the intermediate diameter shaft portion 354 and the small diameter shaft portion 356 to each other and has a tapered shape in which the small diameter shaft portion 356 side has a smaller outer diameter than the intermediate diameter shaft portion 354 side. In the first tapered shaft portion 353 and the second tapered shaft portion 355, the pin member 262 is chamfered and formed. In other words, the diameter of the pin member 262 is adjusted by chamfering. The pin shaft portion 351 in its entirety has a tapered shape in which a side opposite to the support flange portion 350 has a smaller diameter than the support flange portion 350 side.

As illustrated in FIG. 3, the pin member 262 is inserted into the inward side of the inner flange portion 324 of the nut 176 and the hole 261 of the piston rod 21. The pin member 262 forms the hollow chamber 263 between the pin member 262 and the piston rod 21. A gap between the inner flange portion 324 of the nut 176 and the pin member 262 serves as the orifice 326 causing the hollow chamber 263 and the lower chamber 20 to communicate with each other. When the large diameter shaft portion 352 is positionally aligned with the inner flange portion 324 in the axial direction, this orifice 326 has the smallest passage area. When the small diameter shaft portion 356 is positionally aligned with the inner flange portion 324 in the axial direction, the orifice 326 has the largest passage area. In addition, when the intermediate diameter shaft portion 354 is positionally aligned with the inner flange portion 324 in the axial direction, the orifice 326 has an intermediate passage area. Moreover, the orifice 326 is constituted such that the passage area gradually increases as the inner flange portion 324 goes toward the intermediate diameter shaft portion 354 side of the first tapered shaft portion 353 when the first tapered shaft portion 353 is positionally aligned with the inner flange portion 324 in the axial direction. Furthermore, the orifice 326 is constituted such that the passage area gradually increases as the inner flange portion 324 goes toward the small diameter shaft portion 356 side of the second tapered shaft portion 355 when the second tapered shaft portion 355 is positionally aligned with the inner flange portion 324 in the axial direction.

Since the nut 176 integrally moves with the piston rod 21 and the piston 18, the inner flange portion 324 of the nut 176 and the pin member 262 constitute the variable orifice mechanism 325 for adjusting the passage area of the orifice 326 based on the relative position of the piston rod 21 and the piston 18 with respect to the cylinder 2. The orifice 326 is a variable orifice in which the passage area changes in accordance with the relative position of the piston rod 21 and the piston 18 with respect to the cylinder 2. In other words, the variable orifice mechanism 325 adjusts the passage area of the orifice 326 using the pin member 262. The pin member 262 is inserted into the hole 261 and varies the flow channel area of the orifice 326 that is a gap with respect to the hole 261 based on position in the axial direction with respect to the hole 261 that varies depending on the height of the vehicle. The diameter of the pin member 262 is adjusted such that the flow channel area of the orifice 326 is reduced when the movement amount of the nut 176, the piston rod 21, and the piston 18 to the lower chamber 20 side has increased.

As illustrated in FIG. 1, the foregoing base valve 25 is provided between the bottom member 12 of the outer cylinder 4 and the inner cylinder 3. This base valve 25 has a base valve member 371 having substantially a disk shape partitioning the lower chamber 20 and the reservoir chamber 6, a disk valve 372 provided on the lower side of this base valve member 371, namely, the reservoir chamber 6 side, a disk valve 373 provided on the upper side of the base valve member 371, namely, the lower chamber 20 side, an attachment pin 374 attaching the disk valve 372 and the disk valve 373 to the base valve member 371, an interlock member 375 mounted on the outer circumferential side of the base valve member 371, and a support plate 376 supporting the support flange portion 350 of the pin member 262. The attachment pin 374 sandwiches the central side of the disk valve 372 and the disk valve 373 in the radial direction between the attachment pin 374 and the base valve member 371.

In the base valve member 371, the attachment pin 374 is inserted through the middle in the radial direction. A plurality of passage holes 379 for circulating oil between the lower chamber 20 and the reservoir chamber 6 are formed on the outward side of this attachment pin 374 in the radial direction, and a plurality of passage holes 380 for circulating oil between the lower chamber 20 and the reservoir chamber 6 are formed on a side of the passage holes 379 opposite to the attachment pin 374. The disk valve 372 on the reservoir chamber 6 side allows a flow of oil from the lower chamber 20 to the reservoir chamber 6 via the passage holes 379, while restricting a flow of oil from the reservoir chamber 6 to the lower chamber 20 via the passage holes 379 on the inward side. The disk valve 373 allows a flow of oil from the reservoir chamber 6 to the lower chamber 20 via the passage holes 380, while restricting a flow of oil from the lower chamber 20 to the reservoir chamber 6 via the passage holes 380.

The disk valve 372 is opened in the contraction stroke and causes oil to flow from the lower chamber 20 to the reservoir chamber 6 via the passage holes 379. The disk valve 372 is a contraction-side damping valve generating a damping force at this time. The disk valve 373 is opened in the extension stroke and causes oil to flow from the reservoir chamber 6 to the inside of the lower chamber 20 via the passage holes 380. At this time, the disk valve 373 is a suction valve for causing a liquid to flow from the reservoir chamber 6 to the lower chamber 20 without practically generating a damping force such that an insufficient amount of the liquid caused by extension of the piston rod 21 from the cylinder 2 is mainly supplemented.

The interlock member 375 has a tubular shape, and the base valve member 371 is fitted into the inward side thereof. The base valve member 371 is fitted into the inner circumferential portion at the lower end of the inner cylinder 3 via this interlock member 375. An interlock flange portion 395 extending to the inward side in the radial direction is formed at the end portion of the interlock member 375 on the piston 18 side in the axial direction. In the support plate 376, the outer circumferential portion is interlocked with a side of the interlock flange portion 395 opposite to the piston 18, and the inner circumferential portion is interlocked with the piston 18 side of the support flange portion 350 of the pin member 262. Accordingly, the interlock member 375 and the support plate 376 hold the support flange portion 350 of the pin member 262 in a state of abutting the attachment pin 374. A penetration hole (not illustrated) penetrating the support plate 37 in the axial direction is formed therein in a range between the support flange portion 350 and the interlock flange portion 395.

Figure 4:
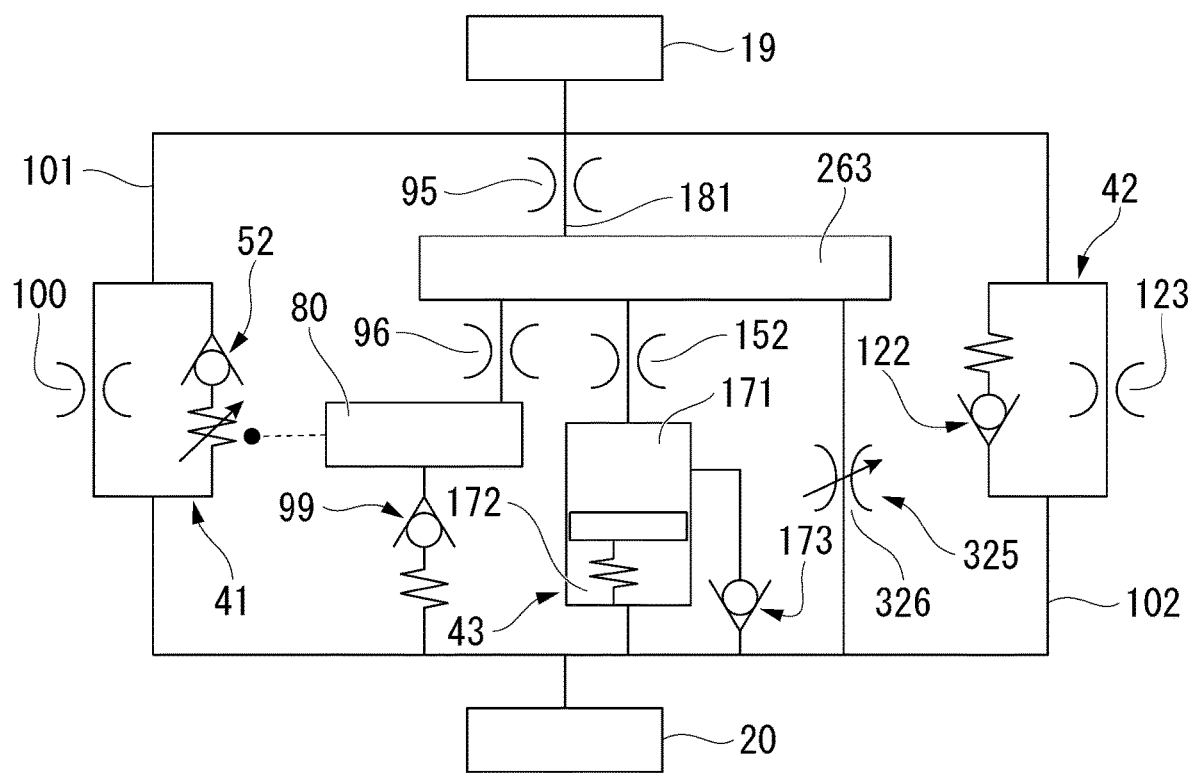
FIG. 4 is a hydraulic circuit diagram around the piston of the shock absorber of the embodiment according to the present invention.

FIG. 4 illustrates a hydraulic circuit diagram of a constitution around the piston 18 of the shock absorber 1 having the foregoing constitution. That is, the main valve 52 and the fixing orifice 100 are provided in the first passage 101 connecting the upper chamber 19 and the lower chamber 20 to each other. The second passage 181 parallel to the first passage 101 communicates with the hollow chamber 263 via the orifice 95, and the hollow chamber 263 is connected to the back pressure chamber 80 via the orifice 96. In the second passage 181, the hollow chamber 263 is connected to the variable capacitance chamber 171 of the frequency sensitive mechanism 43 via the orifice 152. The variable capacitance chamber 172 of the frequency sensitive mechanism 43 communicates with the lower chamber 20. The pressure of the back pressure chamber 80 is applied to the main valve 52 in a closing direction. The back pressure chamber 80 is connected to the lower chamber 20 via the hard valve 99. The check valve 173 is provided between the variable capacitance chamber 171 and the lower chamber 20. Further, in the second passage 181, the orifice 326 of the variable orifice mechanism 325 is provided between the hollow chamber 263 and the lower chamber 20. Furthermore, the disk valve 122 and the fixing orifice 123 are provided in parallel to each other in the first passage 102 connecting the lower chamber 20 and the upper chamber 19 to each other.

Next, operation of the shock absorber 1 will be described.
[At Time of High Vehicle Height (Stroke Extension Position)]

When a load weight of the vehicle is smaller than a predetermined value, such as when a small number of people are riding the vehicle, the vehicle height is in a high vehicle height state larger than the predetermined value.

At the time of such a high vehicle height, in the axial direction of the piston rod 21, for example, the inner flange portion 324 is positionally aligned with the intermediate diameter shaft portion 354.

{When Piston Frequency is Low}
(Extension Stroke)

At the time of such a high vehicle height, in the extension stroke in which the piston rod 21 moves to the extension side at a low piston frequency, when the piston speed is low, oil from the upper chamber 19 flows from the passages inside the passage holes 38 constituting the first passage 101 illustrated in FIG. 3 to the lower chamber 20 via the fixing orifice 100 of the valve seat portion 47. Furthermore, oil also flows to the lower chamber 20 via the orifice 95 inside the cutout 87 of the disk 51 constituting the second passage 181, the passage inside the large diameter hole portion 302 of the piston 18, the third passage 331 inside the radial hole 271 of the piston rod 21, the hollow chamber 263, and the orifice 326 of the variable orifice mechanism 325. Accordingly, a damping force having orifice characteristics (a damping force is substantially proportional to square of the piston speed) is generated. For this reason, regarding the characteristics of a damping force with respect to the piston speed, as indicated by a line portion X1*a* in a low-speed region on the left side of a thin solid line X1 in FIG. 5, a rate of increase in damping force becomes relatively high with respect to increase in piston speed.

If the piston speed increases, oil in the upper chamber 19 flows from the passages inside the passage holes 38 constituting the first passage 101 to the lower chamber 20 via the orifice 95 inside the cutout 87 of the disk 51 constituting the second passage 181, the passage inside the large diameter hole portion 302 of the piston 18, the third passage 331 inside the radial hole 271 of the piston rod 21, the hollow chamber 263, the fourth passage 332 inside the radial hole 272 of the piston rod 21, the passage inside the large diameter hole portion 76 of the sheet member 55, the orifice 96 inside the disks 54 and 53, and the back pressure chamber 80 through a space between the hard valve 99 and the valve seat portion 79 while the hard valve 99 is opened. The characteristics of a damping force with respect to the piston speed at this time become valve characteristics (a damping force is substantially proportional to the piston speed).

Figure 5:
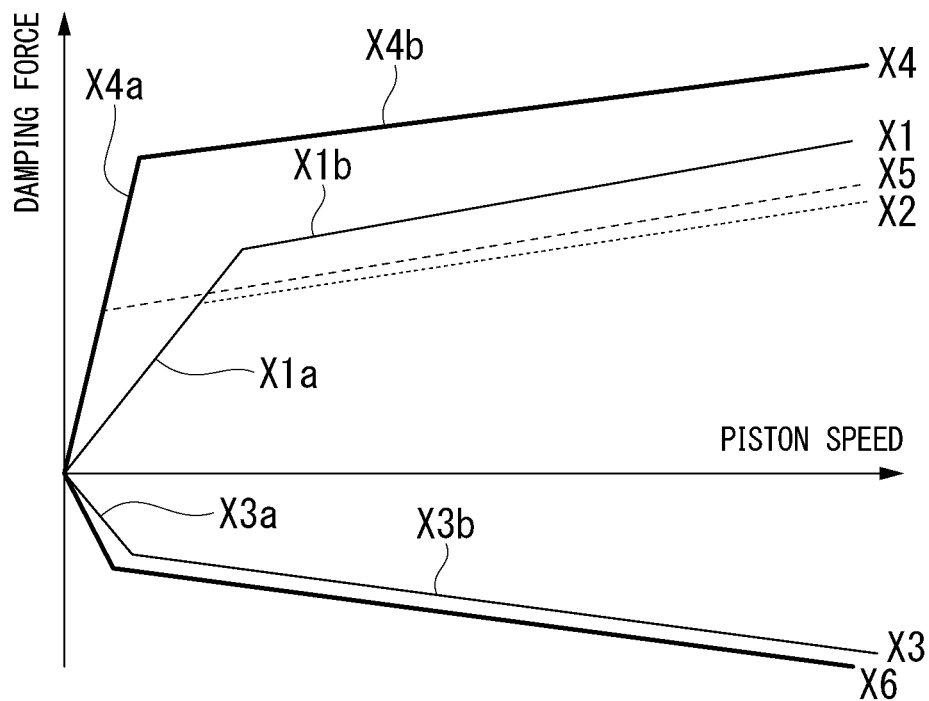
FIG. 5 is a characteristic line diagram conceptually illustrating a relationship of a damping force with respect to a piston speed in the shock absorber of the embodiment according to the present invention.

For this reason, regarding the characteristics of a damping force with respect to the piston speed, as indicated by a line portion X1*b* in an intermediate-high-speed region on the right side of the thin solid line X1 in FIG. 5, the rate of increase in damping force becomes slightly lower than the line portion X1*a* in the low-speed region with respect to increase in piston speed. At this time, oil also flows from the hollow chamber 263 to the lower chamber 20 via the orifice 326 of the variable orifice mechanism 325.

If the piston speed is in a higher speed region, regarding a relationship of a force (oil pressure) acting on the main valve 52 due to oil from the upper chamber 19, a force in the opening direction applied from the passages inside the passage holes 38 becomes greater than a force in the closing direction applied from the back pressure chamber 80. Thus, in this region, the main valve 52 is separated from the valve seat portion 47 of the piston 18 and is opened in accordance with increase in piston speed. In addition to the foregoing flow, oil flows to the lower chamber 20 via the passages inside the passage holes 38 constituting the first passage 101 and the passage 88 between the piston 18 and the outer cylindrical portion 73 of the sheet member 55. Accordingly, a damping force having the valve characteristics (a damping force is substantially proportional to the piston speed) is generated. For this reason, regarding the characteristics of a damping force with respect to the piston speed, as indicated by the line portion X1*b* in the intermediate-high-speed region on the right side of the thin solid line X1 in FIG. 5, the rate of increase in damping force maintains a state of being slightly lower than the line portion X1a in the low-speed region with respect to increase in piston speed. At this time as well, oil also flows from the hollow chamber 263 to the lower chamber 20 via the orifice 326 of the variable orifice mechanism 325.

Here, in the extension stroke when the piston frequency is low, oil from the upper chamber 19 is also introduced into the variable capacitance chamber 171 of the frequency sensitive mechanism 43 via the hollow chamber 263, the fifth passage 333 of the piston rod 21, the passage inside the large diameter hole portion 146 of the case member main body 131, and the orifice 152 of the disk 132. In accordance with this, oil is discharged from the variable capacitance chamber 172 of the frequency sensitive mechanism 43 to the lower chamber 20 via the passage inside the penetration hole 167 of the lid member 139. As a result, the dividing disk 134 which has abutted the seat portion 143 and the disk 135 by that time is deformed such that the protrusion portion 159 approaches the lid member 139. Here, since the inner circumferential side of the dividing disk 134 is separated from the disk 132 and is supported by the disk 135 only from one surface side, the inner circumferential side is likely to be deformed such that it approaches the disk 132, and thus the protrusion portion 159 on the outer circumferential side is easily deformed such that it approaches the lid member 139.

In this manner, although the dividing disk 134 is deformed, the dividing disk 134 has a low deformation frequency following the piston frequency and a large stroke, and although oil flows from the upper chamber 19 to the variable capacitance chamber 171 in an initial stage of the extension stroke, the dividing disk 134 abuts the lid member 139 and stops thereafter, and oil no longer flows from the upper chamber 19 to the variable capacitance chamber 171. Accordingly, as described above, the flow rate of oil flowing to the lower chamber 20 after being introduced into the first passage 101 including the passages inside the passage holes 38 from the upper chamber 19 and passing through the damping force generation mechanism 41 and the orifice 326 of the variable orifice mechanism 325 is not reduced. For this reason, a damping force is maintained in a high state.

{When Piston Frequency is High}

At the time of a high vehicle height, if the piston rod 21 moves to the extension side at a high piston frequency, oil in the upper chamber 19 is caused to flow to the lower chamber 20 through a route similar to that when the piston frequency is low. At this time, a part of oil in the upper chamber 19 is introduced into the variable capacitance chamber 171 of the frequency sensitive mechanism 43 via the passages inside the passage holes 38 constituting the first passage 101 illustrated in FIG. 3, the orifice 95 of the disk 51 constituting the second passage 181, the passage inside the large diameter hole portion 302 of the piston 18, the third passage 331 of the piston rod 21, the hollow chamber 263, the fifth passage 333 of the piston rod 21, the passage inside the large diameter hole portion 146 of the case member main body 131, and the orifice 152 of the disk 132. In accordance with this, oil is discharged from the variable capacitance chamber 172 of the frequency sensitive mechanism 43 that is a part of the second passage 181 on the lower chamber 20 side to the lower chamber 20 via the passage inside the penetration hole 167 of the lid member 139. As a result, the dividing disk 134 which has abutted the seat portion 143 and the disk 135 by that time is deformed such that the protrusion portion 159 approaches the lid member 139.

At this time, since the dividing disk 134 has a high deformation frequency following the piston frequency and a small stroke, oil is introduced into the variable capacitance chamber 171 from the upper chamber 19 so that the flow rate of oil flowing to the lower chamber 20 after being introduced into the first passage 101 including the passages inside the passage holes 38 from the upper chamber 19 and passing through the damping force generation mechanism 41 and the orifice 326 of the variable orifice mechanism 325 is reduced. Accordingly, as indicated by a thin dotted line X2 in FIG. 5, an extension-side damping force decreases and becomes soft compared to when the piston frequency indicated by the thin solid line X1 in FIG. 5 is low. Here, since the inner circumferential side of the dividing disk 134 is separated from the disk 132 and is supported by the disk 135 only from one surface side, the inner circumferential side is likely to be deformed such that it approaches the disk 132, and thus the protrusion portion 159 on the outer circumferential side is easily deformed such that it approaches the lid member 139.

(Contraction Stroke)

In the contraction stroke in which the piston rod 21 moves to the contraction side at the time of a high vehicle height, when the piston speed is low, oil from the lower chamber 20 flows to the upper chamber 19 via the passages inside the passage holes 39 constituting the contraction-side first passage 102 illustrated in FIG. 2 and the fixing orifice 123 of the disk valve 122, a damping force having orifice characteristics (a damping force is substantially proportional to square of the piston speed) is generated. For this reason, regarding the characteristics of a damping force with respect to the piston speed, as indicated by a line portion X3a in the low-speed region on the left side of a thin solid line X3 in FIG. 5, the rate of increase in damping force becomes relatively high with respect to increase in piston speed.

If the piston speed increases, oil introduced from the lower chamber 20 into the passages inside the passage holes 39 constituting the contraction-side first passage 102 basically flows to the upper chamber 19 through a space between the disk valve 122 and the valve seat portion 49 while the disk valve 122 is opened, and thus a damping force having valve characteristics (a damping force is substantially proportional to the piston speed) is generated. For this reason, regarding the characteristics of a damping force with respect to the piston speed, as indicated by a line portion X3b in the intermediate-high-speed region on the right side from the middle of the thin solid line X3 in a lateral direction in FIG. 5, the rate of increase in damping force becomes slightly lower than the line portion X3a in the low-speed region with respect to increase in piston speed.

Here, in the contraction stroke, oil from the lower chamber 20 also flows to the upper chamber 19 from the orifice 326 of the variable orifice mechanism 325 via the hollow chamber 263, the third passage 331 of the piston rod 21, the passage inside the large diameter hole portion 302 of the piston 18, the orifice 95 inside the cutout 87 of the disk 51, and the first passage 101 of the piston 18.

If the pressure of the lower chamber 20 increases, oil introduced from the lower chamber 20 to the variable capacitance chamber 172 of the frequency sensitive mechanism 43 via the passage inside the penetration hole 167 causes the inner circumferential side of the dividing disk 134 constituting the check valve 173 to be deformed and separated from the disk 135 and also flows to the upper chamber 19 via the passage between the dividing disk 134 and the disk 135, the variable capacitance chamber 171, the orifice 152 inside the cutout 151 of the disk 132, the passage inside the large diameter hole portion 146 of the case member main body 131, the fifth passage 333 of the piston rod 21, the hollow chamber 263, the third passage 331 of the piston rod 21, the passage inside the large diameter hole portion 302 of the piston 18, the orifice 95 inside the cutout 87 of the disk 51, and the first passage 101. Regarding the characteristics of a damping force with respect to the piston speed at this time, as indicated by the line portion X3b in the intermediate-high-speed region on the right side of the thin solid line X3 in FIG. 5, the rate of increase in damping force maintains a state of being slightly lower than the line portion X3a in the low-speed region with respect to increase in piston speed in succession. In the contraction stroke, as indicated by the thin solid line X3 in FIG. 5, a damping force entirely becomes soft compared to the extension stroke indicated by the thin solid line X1 in FIG. 5.

[At Time of Low Vehicle Height (Stroke Contraction Position)]

When the load weight of the vehicle is greater than a predetermined value, such as when a large number of people are riding the vehicle or a heavy load is loaded, the vehicle height is smaller than a predetermined value and is in a low vehicle height state lower than the foregoing high vehicle height state.

At the time of such a low vehicle height, the relative positions of the piston rod 21, the piston, and the nut 176 with respect to the cylinder 2 and the pin member 262 are positioned on the bottom member 12 side compared to those at the foregoing time of a high vehicle height. Further, in the axial direction of the piston rod 21, for example, the inner flange portion 324 is positionally aligned with the large diameter shaft portion 352. Thus, the flow channel cross-sectional area of the orifice 326 of the variable orifice mechanism 325 of the piston rod 21 becomes smaller than that at the time of a high vehicle height.

{When Piston Frequency is Low}
(Extension Stroke)

At the time of such a low vehicle height, in the extension stroke in which the piston rod 21 moves to the extension side at a low piston frequency, when the piston speed is low, oil from the upper chamber 19 flows through a route similar to that at the time of a high vehicle height. At this time, since the orifice 326 of the variable orifice mechanism 325 is further tightened than that at the time of a high vehicle height, oil flowing to the lower chamber 20 via the fixing orifice 100 and the orifice 326 is further tightened than that at the time of a high vehicle height. For this reason, in a line portion X4a in the low-speed region on the left side of a bold solid line X4 in FIG. 5 in which a damping force having orifice characteristics is generated, the rate of increase in damping force with respect to increase in piston speed becomes higher than that at the time of a high vehicle height indicated by the line portion X1a of the thin solid line X1.

Since the orifice 326 of the variable orifice mechanism 325 is further tightened than that at the time of a high vehicle height, a force in the opening direction applied from the passages inside the passage holes 38 to the main valve 52 becomes greater than a force in the closing direction applied from the back pressure chamber 80 at a piston speed lower than that at the time of a high vehicle height, and the main valve 52 is opened. Thus, oil flows to the lower chamber 20 via the passages inside the passage holes 38 constituting the first passage 101, and the passage 88 between the piston 18 and the outer cylindrical portion 73 of the sheet member 55. Accordingly, a damping force having valve characteristics is generated. For this reason, regarding the characteristics of a damping force with respect to the piston speed, as indicated by a line portion X4b in the intermediate-high-speed region on the right side of the bold solid line X4 in FIG. 5, the rate of increase in damping force becomes slightly lower than a low-speed region X4a with respect to increase in piston speed. Here, since the orifice 326 of the variable orifice mechanism 325 at the time of a low vehicle height is further tightened than that at the time of a high vehicle height, a pilot pressure in the back pressure chamber 80 of the main valve 52 changes such that it becomes low at the time of a high vehicle height and becomes higher at the time of a low vehicle height than that at the time of a high vehicle height depending on a stroke position of the piston 18. Thus, as indicated by the bold solid line X4 in FIG. 5, in the intermediate-high-speed region X4b, a damping force becomes greater and has harder characteristics than that at the time of a high vehicle height indicated by the thin solid line X1 in FIG. 5.

Here, in the extension stroke when the piston frequency is low, similar to that at the time of a high vehicle height, oil from the upper chamber 19 is also introduced from the hollow chamber 263 into the variable capacitance chamber 171 of the frequency sensitive mechanism 43 via the fifth passage 333 of the piston rod 21, the passage inside the large diameter hole portion 146 of the case member main body 131, and the orifice 152 of the disk 132, and the dividing disk 134 is deformed such that it approaches the lid member 139.

In this manner, although the dividing disk 134 is deformed, the dividing disk 134 has a low deformation frequency following the piston frequency and a large stroke, and although oil flows from the upper chamber 19 to the variable capacitance chamber 171 in an initial stage of the extension stroke, the dividing disk 134 abuts the lid member 139 and stops thereafter, and oil no longer flows from the upper chamber 19 to the variable capacitance chamber 171. Accordingly, the flow rate of oil flowing to the lower chamber 20 after being introduced into the first passage 101 including the passages inside the passage holes 38 from the upper chamber 19 and passing through the damping force generation mechanism 41 and the orifice 326 of the variable orifice mechanism 325 is not reduced. For this reason, a damping force is maintained in a high state.

{When Piston Frequency is High}

At the time of a low vehicle height, if the piston rod 21 moves to the extension side at a high piston frequency, oil in the upper chamber 19 is caused to flow to the lower chamber 20 through a route similar to that when the piston frequency is low. However, at this time, a part of oil in the upper chamber 19 is introduced into the variable capacitance chamber 171 of the frequency sensitive mechanism 43 via the passages inside the passage holes 38 constituting the first passage 101 illustrated in FIG. 3, the orifice 95 of the disk 51 constituting the second passage 181, the passage inside the large diameter hole portion 302 of the piston 18, the third passage 331 of the piston rod 21, the hollow chamber 263, the fifth passage 333 of the piston rod 21, the passage inside the large diameter hole portion 146 of the case member main body 131, and the orifice 152 of the disk 132, and the dividing disk 134 is deformed such that it approaches the lid member 139.

At this time, since the dividing disk 134 has a high deformation frequency following the piston frequency and a small stroke, oil is introduced into the variable capacitance chamber 171 from the upper chamber 19 so that the flow rate of oil flowing to the lower chamber 20 after being introduced into the first passage 101 including the passages inside the passage holes 38 from the upper chamber 19 and passing through the damping force generation mechanism 41 and the orifice 326 of the variable orifice mechanism 325 is reduced. Accordingly, as indicated by a bold dotted line X5 in FIG. 5, the extension-side damping force characteristics decrease and become soft compared to the damping force characteristics when the piston frequency indicated by the bold solid line X4 in FIG. 5 is low. Here, at the time of a low vehicle height, since the amount of oil flowing to the lower chamber 20 via the orifice 326 of the variable orifice mechanism 325 becomes smaller than that at the time of a high vehicle height, the extension-side damping force characteristics indicated by the bold dotted line X5 in FIG. 5 become slightly high and slightly hard compared to the damping force characteristics at the time of a high vehicle height indicated by a thin solid line X2 in FIG. 5.

The difference between the damping force characteristics indicated by the bold dotted line X5 in FIG. 5 at the time of a low vehicle height and the damping force characteristics indicated by the thin dotted line X2 in FIG. 5 at the time of a high vehicle height during a high frequency having a high piston frequency is smaller than the difference between the damping force characteristics indicated by the bold solid line X4 in FIG. 5 at the time of a low vehicle height and the damping force characteristics indicated by the thin solid line X1 in FIG. 5 at the time of a high vehicle height during a low frequency having a low piston frequency.

A rate of decrease in damping force characteristics indicated by the bold dotted line X5 in FIG. 5 during a high frequency to the damping force characteristics indicated by the bold solid line X4 in FIG. 5 during a low frequency at the time of a low vehicle height is higher than a rate of decrease in damping force characteristics indicated by the thin dotted line X2 in FIG. 5 during a high frequency to the damping force characteristics indicated by the thin solid line X1 in FIG. 5 during a low frequency at the time of a high vehicle height.

(Contraction Stroke)

In the contraction stroke in which the piston rod 21 moves to the contraction side at the time of a low vehicle height, oil in the lower chamber 20 is caused to flow to the upper chamber 19 through a route similar to that at the time of a high vehicle height. However, since the orifice 326 of the variable orifice mechanism 325 is tightened compared to that at the time of a high vehicle height, as indicated by a bold solid line X6 in FIG. 5, a damping force has characteristics slightly harder in the entire region of the piston speed than that at the time of a high vehicle height indicated by the thin solid line X3 in FIG. 5.

Here, since the constitutions of the extension-side damping force generation mechanism 41 and the contraction-side damping force generation mechanism 42 are different from each other, when the relative position between the cylinder 2 and the piston 18 is the same, the damping force characteristics in the extension stroke and the damping force characteristics in the contraction stroke become non-inverted.

In the shock absorber 1, in the extension stroke, at the time of a high vehicle height (stroke extension position), since the flow channel cross-sectional area of the orifice 326 positioned on a downstream side of the back pressure chamber 80 is larger than that at the time of a low vehicle height, the pilot pressure in the back pressure chamber 80 is lower than that at the time of a low vehicle height, and the valve open pressure of the main valve 52 is low. The frequency sensitive mechanism 43 imparts a frequency-dependent damping force variable width to the pilot pressure in the back pressure chamber 80. For this reason, at the time of a high vehicle height, the frequency-dependent damping force variable width by the frequency sensitive mechanism 43 is small. On the other hand, at the time of a low vehicle height, since the flow channel cross-sectional area of the orifice 326 is smaller than that at the time of a high vehicle height, the pilot pressure in the back pressure chamber 80 becomes high, and the valve open pressure in the main valve 52 has high characteristics. In addition, due to the function of the frequency sensitive mechanism 43, when the piston frequency is high frequency, the pilot pressure in the back pressure chamber 80 decreases, and a large frequency-dependent variable width by the frequency sensitive mechanism 43 can be adopted.

In the shock absorber 1, in the extension stroke, during a low frequency having a low piston frequency, the damping force characteristics in which the piston speed at the foregoing time of a high vehicle height, that is, while the relative position of the piston 18 with respect to the cylinder 2 is in a first range is from the low-speed region to the high-speed region is regarded as a first damping force characteristic indicated by the thin solid line X1 in FIG. 5.

In the extension stroke, similarly during a low frequency, the damping force characteristics in which the piston speed at the foregoing time of a low vehicle height, that is, while the relative position of the piston 18 with respect to the cylinder 2 is in a second range different from the first range is from the low-speed region to the high-speed region is regarded as a second damping force characteristic indicated by the bold solid line X4 in FIG. 5. Consequently, regarding a damping force having the second damping force characteristic, a damping force at the same piston speed becomes greater and harder than that having the first damping force characteristic in the entire range of the piston speed.

In the extension stroke, during a high frequency having the piston frequency higher than that during the foregoing low frequency, the damping force characteristics in which the piston speed at the foregoing time of a high vehicle height, that is, when the relative position of the piston 18 with respect to the cylinder 2 is in the foregoing first range is from the low-speed region to the high-speed region is regarded as a third damping force characteristic indicated by the thin dotted line X2 in FIG. 5. In the extension stroke, similarly during a high frequency, the damping force characteristics in which the piston speed at the foregoing time of a low vehicle height, that is, while the relative position of the piston 18 with respect to the cylinder 2 is in the foregoing second range is from the low-speed region to the high-speed region is regarded as a fourth damping force characteristic indicated by the bold dotted line X5 in FIG. 5. Consequently, the difference between the third damping force characteristic and the fourth damping force characteristic is smaller than the difference between the first damping force characteristic and the second damping force characteristic.

Figure 6:
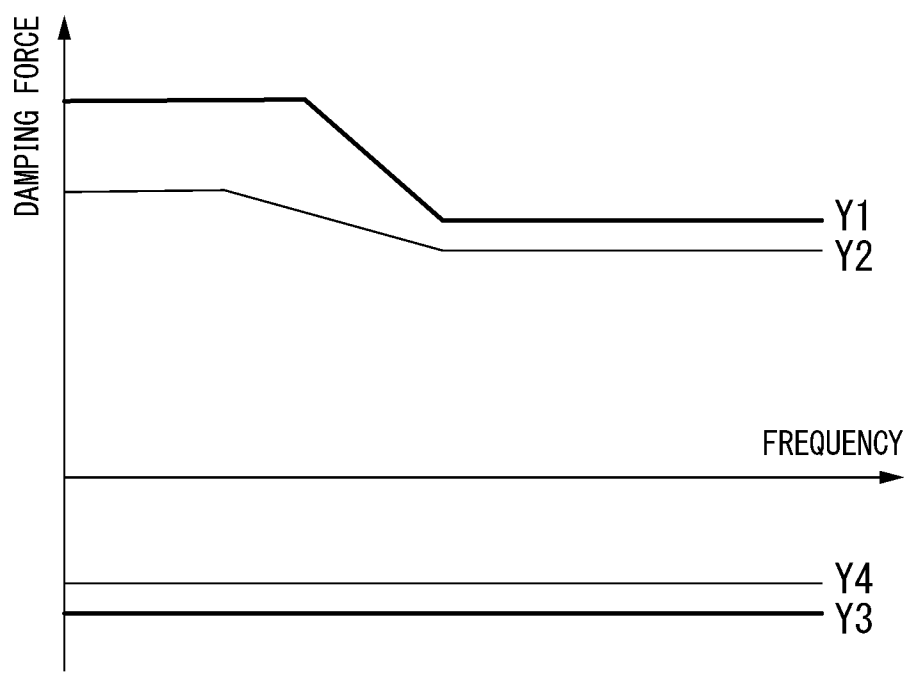
FIG. 6 is a characteristic line diagram conceptually illustrating a relationship of a damping force with respect to a piston frequency in the shock absorber of the embodiment according to the present invention.

FIG. 6 illustrates a relationship of a damping force with respect to the piston frequency of the shock absorber 1. That is, in the extension stroke, in the entire region of the piston frequency, a damping force at the time of a low vehicle height indicated by a bold solid line Y1 in FIG. 6 becomes greater and harder than a damping force at the time of a high vehicle height indicated by a thin solid line Y2 in FIG. 6. In the extension stroke, the difference between the damping forces at the time of a low vehicle height indicated by the bold solid line Y1 in FIG. 6 and at the time of a high vehicle height indicated by the thin solid line Y2 in FIG. 6 becomes smaller in the high frequency region than in the low frequency region of the piston frequency. On the other hand, in the contraction stroke, a damping force at the time of a low vehicle height indicated by a bold solid line Y3 in FIG. 6 becomes harder than that at the time of a high vehicle height indicated by a thin solid line Y4 in FIG. 6 in the entire region of the piston frequency. In the contraction stroke, the difference between the damping forces at the time of a low vehicle height indicated by the bold solid line Y3 in FIG. 6 and at the time of a high vehicle height indicated by the thin solid line Y4 in FIG. 6 becomes constant regardless of the piston frequency.

Thus far, in the foregoing first range at the time of a high vehicle height, compared to the foregoing second range at the time of a low vehicle height, the relative position of the piston 18 with respect to the cylinder 2 is on a side of the upper chamber 19 that is a rod-side chamber in the axial direction of the cylinder 2.

With a simple structure, the shock absorber 1 can perform significant switching of a damping force within a wide range from the low-speed region to the high-speed region of the piston speed with a difference in vehicle height. The shock absorber 1 has an effect in which the function of the frequency sensitive mechanism 43 strongly works, the frequency-dependent variable width is widened, and the riding quality of the vehicle becomes favorable at the time of a low vehicle height when the vehicle weight is heavy, a sprung vibration control force is required, high damping setting is performed, and the riding quality is poor. That is, in the shock absorber in Patent Document 1, at the time of a low vehicle height when the loadage of the vehicle is large, the vehicle weight is heavy, a sprung vibration control force is required, and high damping setting is performed, but the riding quality of 3 Hz or higher becomes poor. In contrast, the shock absorber 1 has an effect of achieving both sprung vibration control at the time of a low vehicle height and the riding quality by causing the function of the frequency sensitive mechanism 43 to be functioned with a sufficient variable width (wide frequency-dependent variable width).

The pin shaft portion 351 of the pin member 262 may have an inverted shape in the axial direction with respect to those described above. That is, the pin shaft portion 351 has a shape in which the diameter decreases toward the bottom member 12 side in its entirety. Consequently, the time of a low vehicle height becomes the foregoing first range and the time of a high vehicle height becomes the foregoing second range so that the relative position of the piston 18 with respect to the cylinder 2 in the first range is on a side of the lower chamber 20 that is the bottom-side chamber in the axial direction of the cylinder 2 compared to the second range.

The foregoing Patent Document 1 discloses a position sensitive damping force variable shock absorber in which a damping force is changed depending on a stroke position. Since this shock absorber is position-sensitive with a variable flow rate, a damping force can only be switched in the low-speed region of the piston speed due to the difference in vehicle height. Patent Document 2 discloses a shock absorber in which a damping force is variable in accordance with a vibration state. This shock absorber has a damping force generation mechanism for pressure control and a flow rate variable-type frequency sensitive mechanism. This shock absorber has no frequency-dependent function for the piston speed equal to or higher than the intermediate speed region. The effect of the frequency sensitive mechanism is small with respect to an input of a high piston speed, such as a rough road surface. In addition, the damping force generation mechanism for pressure control has a complicated structure. Incidentally, in a position sensitive damping force variable shock absorber as described in Patent Document 1, it is desired to favorably control a damping force in accordance with a frequency.

The shock absorber 1 of the present embodiment has the first passage 101 through which oil flows out from the one upper chamber 19 inside the cylinder 2 in response to movement of the piston 18, the second passage 181 provided in parallel to the first passage 101, and the damping force generation mechanism 41 provided in the first passage 101 and generating a damping force. The shock absorber 1 exhibits the first damping force characteristic in which the piston speed is from the low-speed region to the high-speed region while the relative position of the piston 18 with respect to the cylinder 2 is in the first range during a low frequency, and exhibits the second damping force characteristic greater than the first damping force characteristic, in which the piston speed is from the low-speed region to the high-speed region while the relative position of the piston 18 with respect to the cylinder 2 is in the second range different from the first range during a low frequency. In the shock absorber 1, during a high frequency, the difference in damping force characteristics between during the first range and during the second range becomes smaller than the difference between the first damping force characteristic and the second damping force characteristic. In the shock absorber 1, in order to achieve such characteristics, the second passage 181 is provided with the variable orifice mechanism 325 which can change the orifice area depending on the relative position of the piston 18 with respect to the cylinder 2, and the frequency sensitive mechanism 43 in which a damping force during a low frequency becomes greater than a damping force during a high frequency regardless of the piston speed. According to the shock absorber 1 having such a constitution, a damping force can be made variable by means of position sensitiveness, and therefore it is possible to favorably control a damping force in accordance with a frequency.

In the shock absorber 1, in the first range, compared to the second range, the relative position of the piston 18 with respect to the cylinder 2 is on a side of the upper chamber 19 that is a rod-side chamber. That is, the vehicle height is lower in the second range than in the first range. For this reason, a damping force can be increased when the loadage of the vehicle is heavy, but it becomes a soft damping force with respect to a push-up from a road surface to the wheel.

Here, in the first range, compared to the second range, the relative position of the piston 18 with respect to the cylinder 2 may be on a side of the lower chamber 20 that is a bottom-side chamber. That is, the vehicle height may be higher in the second range than in the first range. Due to such a constitution, a damping force when the piston rod 21 is fully extended can be increased, thereby being a hydraulic stopper.

The shock absorber 1 has the first passage 101 through which oil flows out from the one upper chamber 19 inside the cylinder 2 in response to movement of the piston 18 and which is formed in the piston 18; the second passage 181 which is provided in parallel to the first passage 101; the damping force generation mechanism 41 which has the main valve 52 provided in the first passage 101 and generating a damping force, and the back pressure chamber 80 applying a back pressure to the main valve 52; the nut 176 in which at least a part of the second passage 181 is formed; the dividing disk 134 which is disposed inside the case member 140 and is able to flex inside the case member 140; the variable capacitance chambers 171 and 172 inside the case member 140 which is defined and provided by the dividing disk 134; the hole 261 which is formed on the inner circumferential side of the piston rod 21; the pin member 262 which is inserted into the hole 261 and varies a gap with respect to the hole 261 depending on the position of the cylinder 2 in the axial direction; and the hollow chamber 263 which is formed by the hole 261 and the pin member 262. Further, the hollow chamber 263 communicates with the third passage 331 through which oil in the upper chamber 19 is supplied in a state not changing depending on the relative position between the cylinder 2 and the piston 18, the fourth passage 332 through which oil is supplied to the back pressure chamber 80, the fifth passage 333 through which oil is supplied to the case member 140, and the orifice 326 through which oil is supplied to the lower chamber 20 via the nut 176. According to the shock absorber 1 having such a constitution, a damping force can be made variable by means of position sensitiveness, and therefore it is possible to favorably control a damping force in accordance with a frequency. In addition, with a simple structure, significant switching of a damping force can be performed within a wide range from the low-speed region to the high-speed region with a difference in vehicle height.

In the shock absorber 1, since oil in the upper chamber 19 is supplied to the second passage 181 via the first passage 101 formed in the piston 18, the structure can be simplified.

In the shock absorber 1, the diameter of the pin member 262 is adjusted such that the orifice 326 is reduced when the movement amount of the piston 18 to the side of the lower chamber 20 has increased. For this reason, a damping force can be increased when the loadage of the vehicle is heavy, but it becomes a soft damping force with respect to a push-up from a road surface to the wheel.

In the shock absorber 1, the diameter of the pin member 262 is adjusted by chamfering. For this reason, when the position of the piston 18 in the axial direction with respect to the pin member 262 is changed, a damping force can be smoothly changed.

In the shock absorber 1, when the relative position between the cylinder 2 and the piston 18 is the same, the damping force characteristics in the extension stroke and the damping force characteristics in the contraction stroke are non-inverted. For this reason, the damping force characteristics in the extension stroke and the damping force characteristics in the contraction stroke can be varied.

In the shock absorber 1, the second passage 181 branches from the first passage 101 via the orifice 95 formed by the disk 51 abutting the piston 18. For this reason, the damping force characteristics can be easily changed by changing the orifice 95 formed by the disk 51, and thus the degree of freedom in tuning is high. Here, the variable widths of the damping force generation mechanism 41 and the frequency sensitive mechanism 43 can be extended by increasing the flow channel cross-sectional area of the orifice 95. On the other hand, the variable widths of the damping force generation mechanism 41 and the frequency sensitive mechanism 43 can be reduced by reducing the flow channel cross-sectional area of the orifice 95, and thus a damping force can have soft characteristics.

In the shock absorber 1, the frequency sensitive mechanism is not limited to the foregoing frequency sensitive mechanism 43, and other frequency sensitive mechanisms may be applied as long as they are pressure-variable frequency sensitive mechanism. In addition, the frequency sensitive mechanism 43 may not have the check valve 173. Moreover, a member for partitioning the variable capacitance chambers 171 and 172 in the frequency sensitive mechanism 43 may not be the dividing disk 134. In addition, the variable capacitance chambers 171 and 172 may be partitioned in the frequency sensitive mechanism 43 with a disk having no seal member on the outer circumferential side.

According to a first aspect of the embodiment described above, a shock absorber includes a cylinder in which an operation fluid is sealed, a piston which is provided in a manner of being able to slide inside the cylinder and divides the inside of the cylinder into a rod-side chamber and a bottom-side chamber, a piston rod in which one end side is coupled to the piston and the other end side extends to the outside of the cylinder, a first passage through which an operation fluid flows out from one chamber inside the cylinder in response to movement of the piston, a second passage which is provided in parallel to the first passage, and a damping force generation mechanism which is provided in the first passage and generates a damping force. The shock absorber is constituted such that a first damping force characteristic is exhibited when a piston speed is from a low-speed region to a high-speed region while a relative position of the piston with respect to the cylinder is in a first range during a low frequency, a second damping force characteristic greater than the first damping force characteristic is exhibited when the piston speed is from the low-speed region to the high-speed region while the relative position of the piston with respect to the cylinder is in a second range different from the first range during a low frequency, and the difference in damping force characteristic between during the first range and during the second range is smaller than the difference between the first damping force characteristic and the second damping force characteristic during a high frequency. The second passage is provided with a variable orifice mechanism in which an orifice area is able to change depending on a relative position of the piston with respect to the cylinder, and a frequency sensitive mechanism in which a damping force during a low frequency is greater than a damping force during a high frequency regardless of the piston speed. Accordingly, in a position sensitive damping force variable shock absorber, it is possible to favorably control a damping force in accordance with a frequency.

According to a second aspect, in the first aspect, the relative position of the piston with respect to the cylinder is closer to a side of the rod-side chamber in the first range than in the second range.

According to a third aspect, in the first aspect, the relative position of the piston with respect to the cylinder is closer to a side of the bottom-side chamber in the first range than in the second range.

According to a fourth aspect, a shock absorber includes a cylinder in which an operation fluid is sealed; a piston which is provided in a manner of being able to slide inside the cylinder and divides the inside of the cylinder into a rod-side chamber and a bottom-side chamber; a piston rod in which one end side is coupled to the piston and the other end side extends to the outside of the cylinder; a first passage through which an operation fluid flows out from one chamber inside the cylinder in response to movement of the piston and which is formed in the piston; a second passage which is provided in parallel to the first passage; a damping force generation mechanism which has a first valve provided in the first passage and generating a damping force, and a back pressure chamber applying a back pressure to the first valve; a tightening member in which at least a part of the second passage is formed; a flexible member which is disposed inside a case member and is able to flex inside the case member; a chamber inside the case member which is defined and provided by the flexible member; a hole which is formed on an inner circumferential side of the piston rod; a pin member which is inserted into the hole and varies a gap with respect to the hole depending on a position in an axial direction; and a hollow chamber which is formed by the hole and the pin member. The hollow chamber communicates with a third passage through which an operation fluid in the rod-side chamber is supplied in a state not changing depending on a relative position between the cylinder and the piston, a fourth passage through which an operation fluid is supplied to the back pressure chamber, a fifth passage through which an operation fluid is supplied to the case member, and a sixth passage through which an operation fluid is supplied to the bottom-side chamber via the tightening member. Accordingly, in the position sensitive damping force variable shock absorber, it is possible to favorably control a damping force in accordance with a frequency.

According to a fifth aspect, in the fourth aspect, an operation fluid in the rod-side chamber is supplied to the second passage via the first passage formed in the piston.

According to a sixth aspect, in the fifth aspect, the second passage branches from the first passage via an orifice formed by a disk abutting the piston.

According to a seventh aspect, in any one of the fourth to sixth aspects, a diameter of the pin member is adjusted such that the gap is reduced when a movement amount of the piston to a side of the bottom-side chamber has increased.

According to an eighth aspect, in the seventh aspect, the diameter of the pin member is adjusted by chamfering.

According to a ninth aspect, in any one of the fourth to eighth aspects, when the relative position between the cylinder and the piston is the same, a damping force characteristic of an extension stroke and a damping force characteristic of a contraction stroke are non-inverted.

INDUSTRIAL APPLICABILITY

According to the foregoing shock absorber, in a position sensitive damping force variable shock absorber, it is possible to favorably control a damping force in accordance with a frequency.

REFERENCE SIGNS LIST

1 Shock absorber
2 Cylinder
18 Piston
19 Upper chamber (rod-side chamber)
20 Lower chamber (bottom-side chamber)
21 Piston rod
41 Damping force generation mechanism
43 Frequency sensitive mechanism
51 Disk
52 Main valve (first valve)
80 Back pressure chamber
95 Orifice
101 First passage
134 Dividing disk (flexible member)
140 Case member
171, 172 Variable capacitance chamber (chamber)
176 Nut (tightening member)
181 Second passage
261 Hole
262 Pin member
263 Hollow chamber
325 Variable orifice mechanism
326 Orifice (sixth passage)
331 Third passage
332 Fourth passage
333 Fifth passage

The invention claimed is:
1. A shock absorber comprising:
a cylinder in which an operation fluid is sealed;
a piston which is provided in a manner of being able to slide inside the cylinder and divides an inside of the cylinder into a rod-side chamber and a bottom-side chamber;
a piston rod in which one end side is coupled to the piston and the other end side extends to an outside of the cylinder;
a first passage through which an operation fluid flows out from one chamber inside the cylinder in response to movement of the piston;
a second passage which is provided in parallel to the first passage; and
a damping force generation mechanism which is provided in the first passage and generates a damping force,
wherein the second passage is provided with:
a variable orifice mechanism in which an orifice area is able to change depending on a relative position of the piston with respect to the cylinder; and
a frequency sensitive mechanism in which a damping force during a low frequency is greater than a damping force during a high frequency regardless of a piston speed, and
wherein the shock absorber is configured such that:
a first damping force characteristic is exhibited when the piston speed is from a low-speed region to a high-speed region while the relative position of the piston with respect to the cylinder is in a first range during the low frequency;
a second damping force characteristic greater than the first damping force characteristic is exhibited when the piston speed is from the low-speed region to the high-speed region while the relative position of the piston with respect to the cylinder is in a second range different from the first range during the low frequency;
a third damping force characteristic is exhibited when the piston speed is from the low-speed region to the high-speed region while the relative position of the piston with respect to the cylinder is in the first range during the high frequency;
a fourth damping force characteristic is exhibited when the piston speed is from the low-speed region to the high-speed region while the relative position of the piston with respect to the cylinder is in the second range during the high frequency; and
a difference between the third dampening force characteristic and the fourth dampening force characteristic is smaller than a difference between the first damping force characteristic and the second damping force characteristic during the high frequency.
2. The shock absorber according to claim 1,
wherein the relative position of the piston with respect to the cylinder is closer to a side of the rod-side chamber in the first range than in the second range.
3. The shock absorber according to claim 1,
wherein the relative position of the piston with respect to the cylinder is closer to a side of the bottom-side chamber in the first range than in the second range.
4. A shock absorber comprising:
a cylinder in which an operation fluid is sealed;
a piston which is provided in a manner of being able to slide inside the cylinder and divides an inside of the cylinder into a rod-side chamber and a bottom-side chamber;

a piston rod in which one end side is coupled to the piston and the other end side extends to an outside of the cylinder;

a first passage through which an operation fluid flows out from one chamber inside the cylinder in response to movement of the piston and which is formed in the piston;

a second passage which is provided in parallel to the first passage;

a damping force generation mechanism which has a first valve provided in the first passage and generating a damping force, and a back pressure chamber applying a back pressure to the first valve;

a tightening member in which at least a part of the second passage is formed;

a flexible member which is disposed inside a case member and is able to flex inside the case member;

a chamber inside the case member which is defined and provided by the flexible member;

a hole which is formed on an inner circumferential side of the piston rod;

a pin member which is inserted into the hole and varies a gap with respect to the hole depending on a position in an axial direction; and a hollow chamber which is formed by the hole and the pin member, wherein the hollow chamber communicates with:
- a third passage through which an operation fluid in the rod-side chamber is supplied in a state that does not change based on a relative position between the cylinder and the piston;
- a fourth passage through which an operation fluid is supplied to the back pressure chamber;
- a fifth passage through which an operation fluid is supplied to the case member; and
- a sixth passage through which an operation fluid is supplied to the bottom-side chamber via the tightening, and wherein an operation fluid in the rod-side chamber is supplied to the second passage via the first passage formed in the piston.

5. The shock absorber according to claim 4, wherein the second passage branches from the first passage via an orifice formed by a disk abutting the piston.

6. The shock absorber according to claim 4, wherein a diameter of the pin member is adjusted such that the gap is reduced when a movement amount of the piston to a side of the bottom-side chamber has increased.

7. The shock absorber according to claim 6, wherein the diameter of the pin member is adjusted by chamfering.

8. The shock absorber according to claim 4, wherein when the relative position between the cylinder and the piston is the same in an extension stroke and in a contraction stroke, a damping force characteristic of the extension stroke is not an inverted version of a damping force characteristic of the contraction stroke.

* * * * *